United States Patent
Peters et al.

(10) Patent No.: US 10,010,961 B2
(45) Date of Patent: Jul. 3, 2018

(54) MULTIPLE ARC WELDING SYSTEM CONTROLS AND METHODS

(75) Inventors: Steven R. Peters, Huntsburg, OH (US); Joseph Allen Daniel, Sagamore Hills, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 2943 days.

(21) Appl. No.: 11/457,864

(22) Filed: Jul. 17, 2006

(65) Prior Publication Data

US 2008/0011728 A1 Jan. 17, 2008

(51) Int. Cl.
*B23K 9/10* (2006.01)

(52) U.S. Cl.
CPC .......... *B23K 9/1068* (2013.01); *B23K 9/1062* (2013.01)

(58) Field of Classification Search
CPC ...... B23K 9/10; B23K 9/1068; B23K 9/1087; B23K 9/1062
USPC .... 219/130.5, 130.01, 130.1, 130.21, 130.51
See application file for complete search history.

(56) References Cited

U.S. PATENT DOCUMENTS

| | | | |
|---|---|---|---|
| 1,340,056 A * | 5/1920 | Kenyon | 314/36 |
| 2,938,107 A | 5/1960 | Pease | |
| 3,342,973 A | 9/1967 | Smith et al. | |
| 3,627,978 A | 12/1971 | Endo et al. | |
| 3,746,833 A | 7/1973 | Ujiie | |
| 4,246,463 A | 1/1981 | Shutt et al. | |
| 4,806,735 A | 2/1989 | Ditshun et al. | |
| 4,897,522 A | 1/1990 | Bilczo et al. | |
| 5,001,326 A | 3/1991 | Stava | |
| 5,136,139 A * | 8/1992 | Gilliland | 219/137 PS |
| 5,155,330 A | 10/1992 | Fratiello et al. | |
| 5,278,390 A | 1/1994 | Blankenship | |
| 5,349,157 A | 9/1994 | Blankenship | |
| 5,351,175 A | 9/1994 | Blankenship | |
| 5,482,734 A | 1/1996 | Herwig et al. | |
| 5,676,857 A | 10/1997 | Parker | |
| 5,715,150 A | 2/1998 | Stava | |
| 5,864,116 A | 1/1999 | Baker | |
| 5,906,761 A * | 5/1999 | Gilliland et al. | 219/124.34 |
| 6,002,104 A | 12/1999 | Hsu | |
| 6,111,216 A | 8/2000 | Stava | |
| 6,172,333 B1 | 1/2001 | Stava | |
| 6,207,929 B1 | 3/2001 | Stava et al. | |
| 6,291,798 B1 | 9/2001 | Stava | |
| 6,472,634 B1 | 10/2002 | Spear | |

(Continued)

FOREIGN PATENT DOCUMENTS

| | | |
|---|---|---|
| GB | 282527 | 12/1927 |
| GB | 554687 | 7/1943 |
| WO | 2006/075215 A1 | 7/2006 |

OTHER PUBLICATIONS

International Search Report, PCT/US2007/064124, dated Feb. 14, 2008.
Lincoln Electric, Power Feed 10 Wire Drive & Control Box, Boom Mount or Bench Model, IM584-D, Oct. 2003.

(Continued)

*Primary Examiner* — Dana Ross
*Assistant Examiner* — Ayub Maye
(74) *Attorney, Agent, or Firm* — Hahn Loeser & Parks LLP

(57) ABSTRACT

Multiple arc welding systems are provided, along with welding system controllers and control methods, in which a single user selected system setpoint value is used to derive individual machine setpoints for a plurality of welding machines in the multiple arc welding system.

23 Claims, 21 Drawing Sheets

(56) References Cited

U.S. PATENT DOCUMENTS

| | | |
|---|---|---|
| 6,486,439 B1 | 11/2002 | Spear et al. |
| 6,624,388 B1 | 9/2003 | Blankenship et al. |
| 6,649,870 B1 | 11/2003 | Barton et al. |
| 6,683,279 B1 | 1/2004 | Moerke |
| 6,700,097 B1 | 3/2004 | Hsu et al. |
| 6,717,108 B2 | 4/2004 | Hsu |
| 6,734,394 B2 | 5/2004 | Hsu |
| 6,920,371 B2 | 7/2005 | Hillen et al. |
| 6,940,039 B2 | 9/2005 | Blankenship et al. |
| 7,105,773 B2 * | 9/2006 | Myers et al. ............ 219/130.51 |
| 2005/0133488 A1 | 6/2005 | Blankenship et al. |
| 2005/0173390 A1 | 8/2005 | Lanouette et al. |
| 2006/0037952 A1 | 2/2006 | Myers et al. |
| 2006/0131290 A1 | 6/2006 | Stava |

OTHER PUBLICATIONS

Lincoln Electric, NA-5 Automatic Welding Systems, Automatic Wire Feeders, pp. 1-8.
Lincoln Electric, Power Wave 455M & Power Wave 455M/STT.
Lincoln Electric, Power MIG 350MP, Publication E7.57, pp. 1-8, Dec. 2004.
Lincoln Electric, Power Feed 10M, Publication E8.266, pp. 1-8, Aug. 2004.
Lincoln Electric, LF-72 and LF-74 Wire Feeders, Publication E8.11, pp. 1-8, Apr. 2005.
Lincoln Electric, Automatic Welding Systems with Solid State Controls, Underwrites Laboratories Listed.
Lincoln Electric, Wave Designer, Arc Works Software Series, S2.20, pp. 1-4, May 2000.

* cited by examiner

MULTIPLE ARC WELDING SYSTEM CONTROLS AND METHODS

FIELD OF THE INVENTION

The present invention relates generally to arc welding, and more particularly to methods and apparatus for controlling a plurality of welding machines in a multiple arc welding system.

BACKGROUND

Arc welding applications are often automated in order to improve productivity. Some automated arc welding applications use multiple welding electrodes to further increase productivity. One such example is in the manufacture of heavy fabrications where double or triple SAW electrodes are used together in the same welding puddle to increase weld metal deposit rate. Another example is in the use of two tandem GMAW electrodes at high travel speeds to make long straight weldments. A third example uses multiple electrodes to weld two or more parallel joints all at the same time. These applications are sometimes referred to as multiple electrode, multiple arc, or multi-arc welding systems. An operator must be well experienced in order to make adjustments to the numerous welding parameters to achieve a good weld, even in single-arc applications. Multiple arc systems present an even greater challenge, as the operator must to coordinate the settings for the individual arcs to achieve a balanced overall system-wide welding performance. Furthermore, increased sophistication in welding power source design and associated advancements in welding processes have resulted in further increase in the number of welding parameters for each arc. This increase in the number of parameters results in an exponential increase in the number of adjustments possible in multiple electrode welding applications, thereby further complicating the task of parameter selection. Accordingly, a method and apparatus to simplify and coordinate the number of welding parameters of multiple electrode welding systems is desirable.

SUMMARY

A summary of one or more aspects of the invention is now presented in order to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The present invention is related to multiple arc welding systems and control apparatus and methods therefor, in which a single system controller provides local welding machine setpoint values to two or more welding machines in a multiple arc system based on a single user selected system setpoint. The invention may be employed to facilitate ease in synergic configuration and operation of components in a multiple arc system without requiring the user or operator to carefully balance settings on individual machines, wherein a single knob control or other user adjustable setting can be used to adjust the total output of the entire system. The system performance may thus be set according to a system setpoint, such as deposition rate, weld size, wire feed speed, current, voltage, travel speed, etc., and the system controller divides or allocates the system setpoint into the local setpoints for the individual welding machines.

BRIEF DESCRIPTION OF THE DRAWINGS

The following description and drawings set forth certain illustrative implementations of the invention in detail, which are indicative of several exemplary ways in which the principles of the invention may be carried out. Other objects, advantages and novel features of the invention will become apparent from the following detailed description of the invention when considered in conjunction with the drawings, in which.

DETAILED DESCRIPTION OF THE INVENTION

Figure 1A:
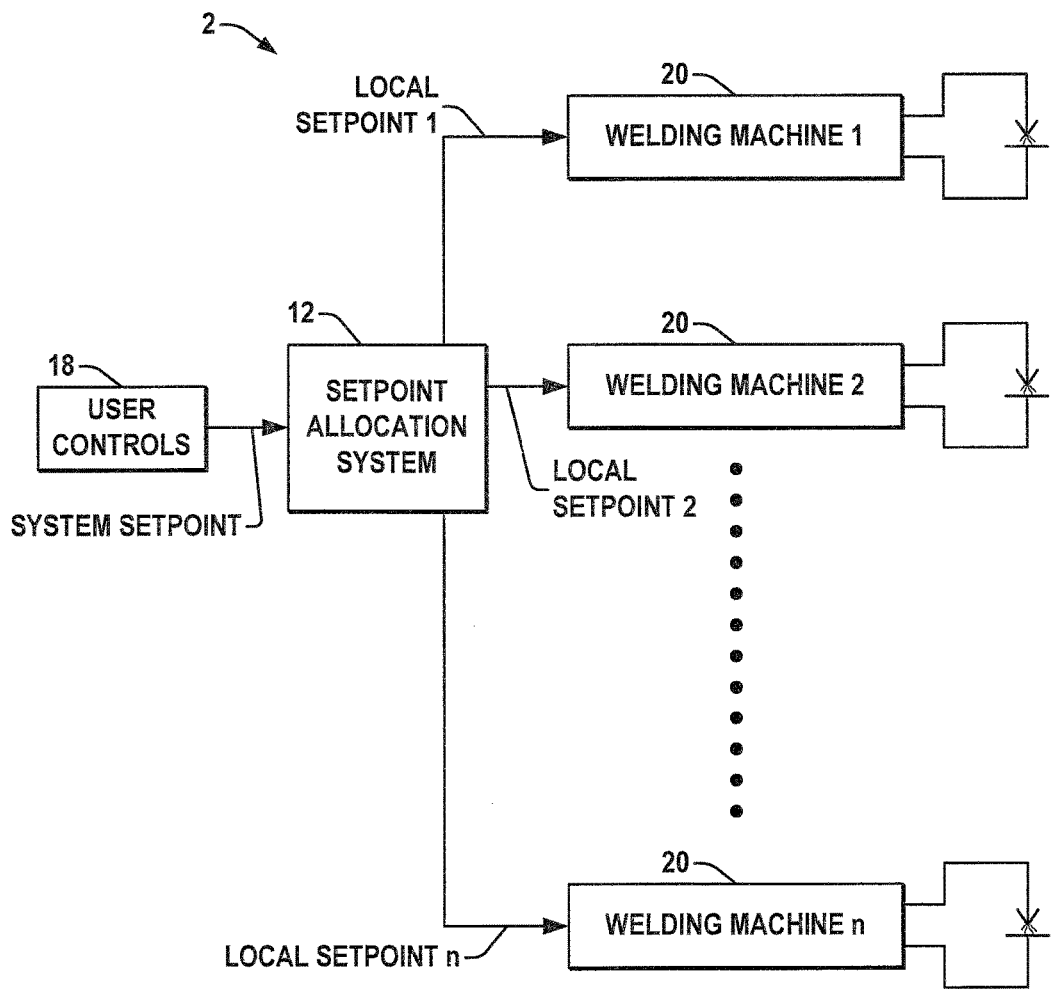
FIG. 1A is a simplified schematic diagram illustrating a multiple-arc welding system with a workpoint or setpoint allocation system in accordance with one or more aspects of the present invention.

Referring now to the figures, several embodiments or implementations of the present invention are hereinafter described in conjunction with the drawings, wherein like reference numerals are used to refer to like elements throughout and wherein the illustrated structures are not necessarily drawn to scale. The present invention provides synergic control of multiple arc welding systems and finds particular utility in association with tandem welding applications where the system setpoint may be a total deposition rate. Although illustrated and described hereinafter in the context of such exemplary tandem welding systems, the invention is not limited to the illustrated examples.

FIG. 1A illustrates an exemplary multiple-arc welding system 2 with an integer number "n" welding machines 20 and a workpoint or setpoint allocation system 12 providing local or machine setpoint or workpoint values to the machines 20 for creating "n" welding arcs in accordance with various aspects of the present invention. The setpoint allocation system 12 receives a user selected system setpoint value from a user control 18 and provides the local machine setpoint values to the welding machines 20 based on the system setpoint value. The welding machines, in turn, provide individual welding signal waveforms according to the corresponding local setpoint so as to create a corresponding welding arc in order to set a total output of the overall welding system 2 according to the system setpoint value from the user controls 18. The system 2 may be employed in performing any type of multiple arc welding process in which two or more welding arcs are used to weld a workpiece, including but not limited to tandem arc welding processes, twin arc welding processes, and dual fillet welding processes.

Figure 1B:
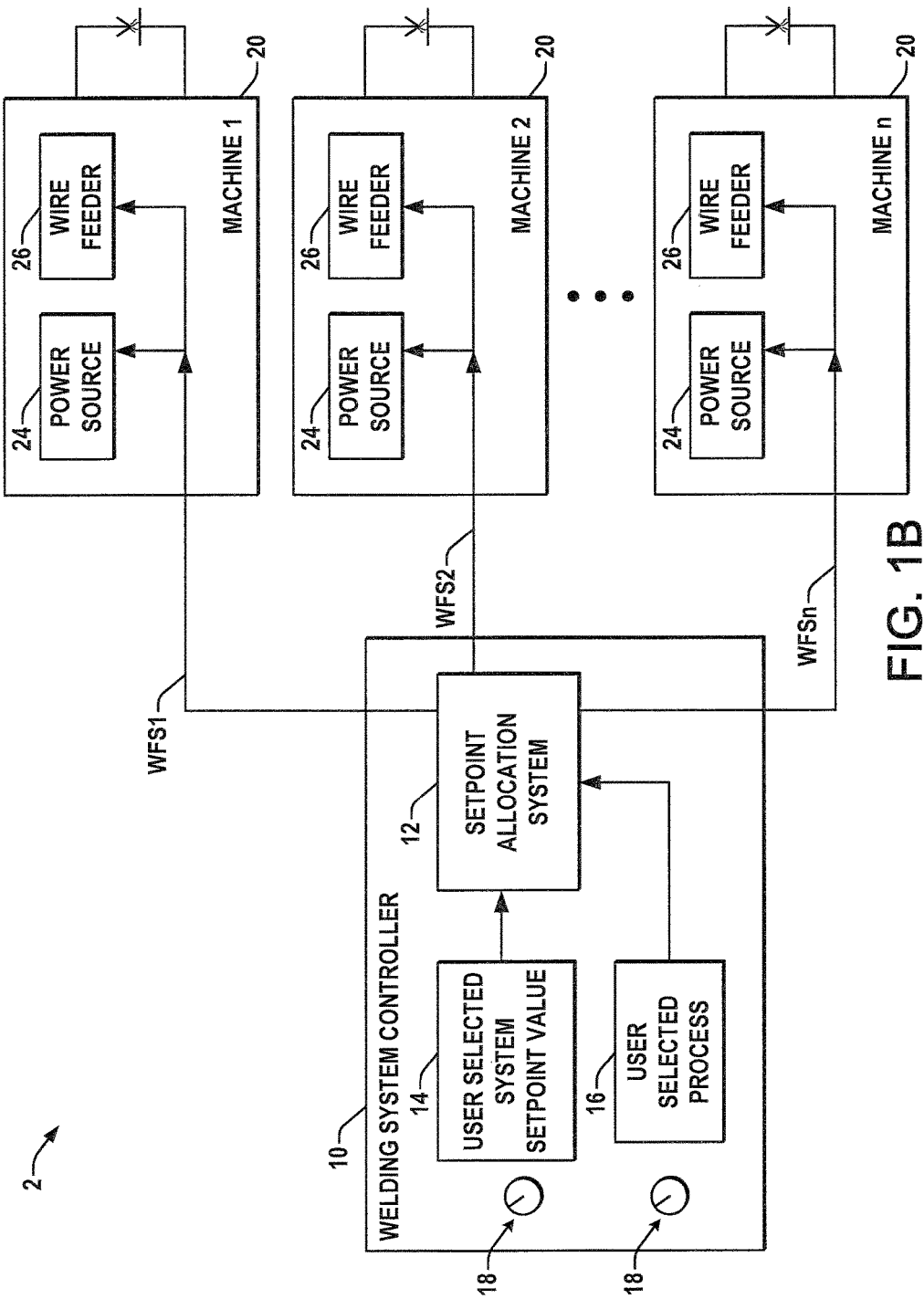
FIG. 1B is a detailed schematic diagram illustrating further details of the exemplary welding system with a plurality of welding machines and a welding system controller with a setpoint allocation system that provides individual setpoint values to the welding machines based on a user selected system setpoint value in accordance with one or more aspects of the present invention.

FIG. 1B illustrates further details of the exemplary system 2, in which a welding system controller 10 is provided with a setpoint allocation system 12 operatively coupled with a plurality of welding machines 20 to provide simplified single-knob type synergic user adjustability of the overall system output performance. The system 2 and other systems and controllers 10 of the invention provide the single-knob control advantages in the context of system-wide operational performance, wherein a single knob or user adjustable value is used to adjust or control the total output of the entire system. The system controller 10 may simply provide various machine setpoint values for use in the individual welding machines 20 with no feedback, or the concepts of the invention may be employed in conjunction with closed loop control techniques in which an outer control loop provides feedback adjustment based on measured actual or estimated total system output. In this regard, the invention is not limited to any particular system-wide setpoint type, wherein the user selected system setpoint value may be in terms of any value associated with a multiple arc welding system operation, including but not limited to total deposition rate, total welding current, total welding voltage, weld size, total wire feed speed, travel speed (e.g. linear welding speed characterizing relative movement of the workpiece or the welding equipment), etc.

The exemplary system controller 10 may provide various control functions in the system 2, such as data acquisition, monitoring, etc., in addition to the setpoint allocation functions specified hereinafter, and may include various interface apparatus for interaction with a user (e.g., a user interface with one or more value adjustment apparatus such as knobs, switches, etc., and information rendering devices, such as graphical or numeric displays, etc.), and or for direct or indirect interconnection to or with other devices in the system (e.g., operative connection with the machines 20 or other welding equipment forming a part of system 2) and/or with external devices, such as through network connections, etc., whether for exchanging signals and/or communications messaging, including wire based and wireless couplings. In particular, the exemplary system controller 10 is able to receive a user selected system setpoint value 14, which may be obtained by a user adjusting one or more knobs 18 on a faceplate interface of system controller 10, or may be obtained from another device, for example, from a hierarchical controller or user interface coupled with system 2 through a network or other communicative means (not shown).

Figure 22:
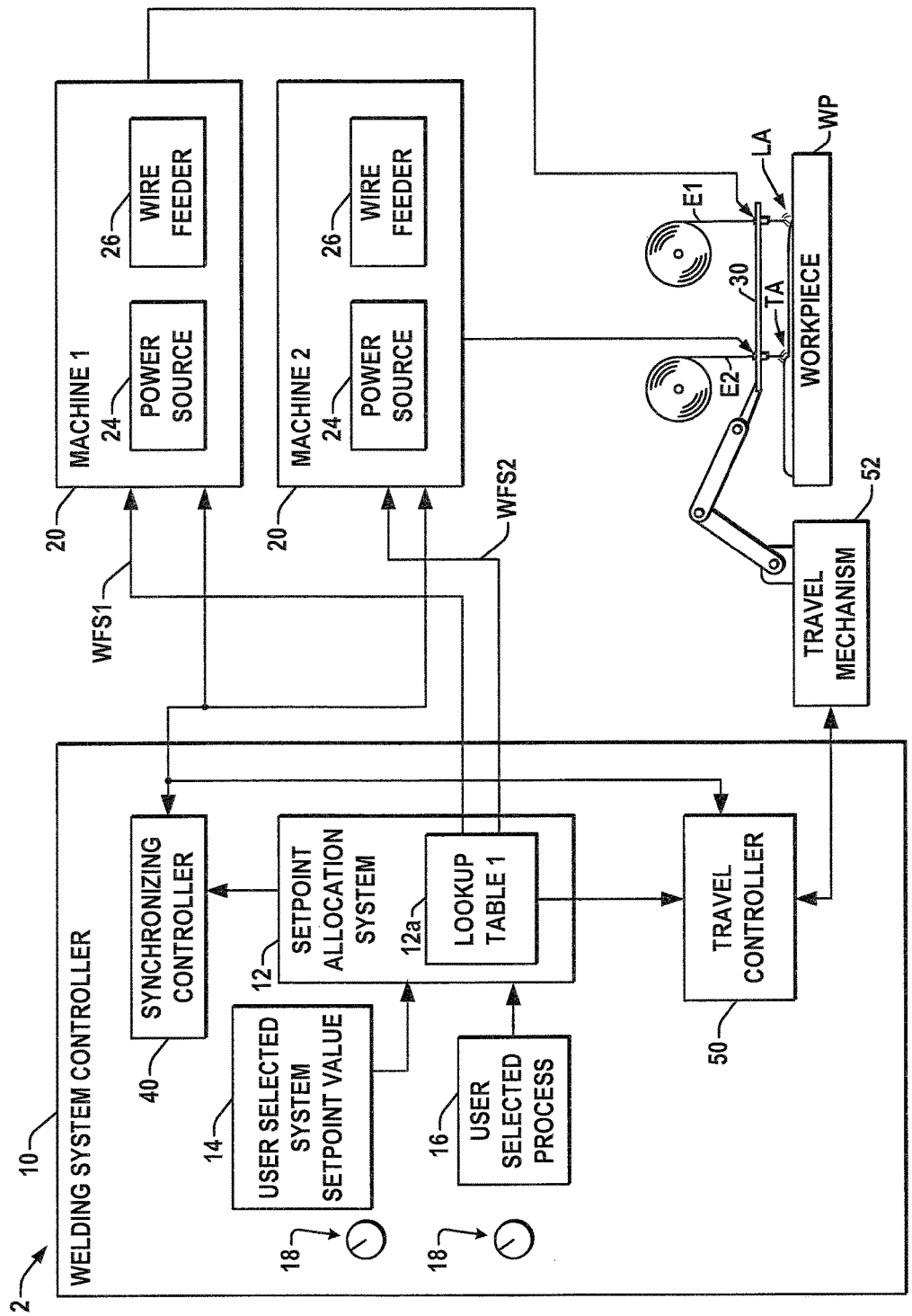
FIG. 22 is a partial schematic diagram showing another exemplary welding system in which a synchronizing controller and a travel mechanism controller are integrated in the welding system controller.
Figure 22A:
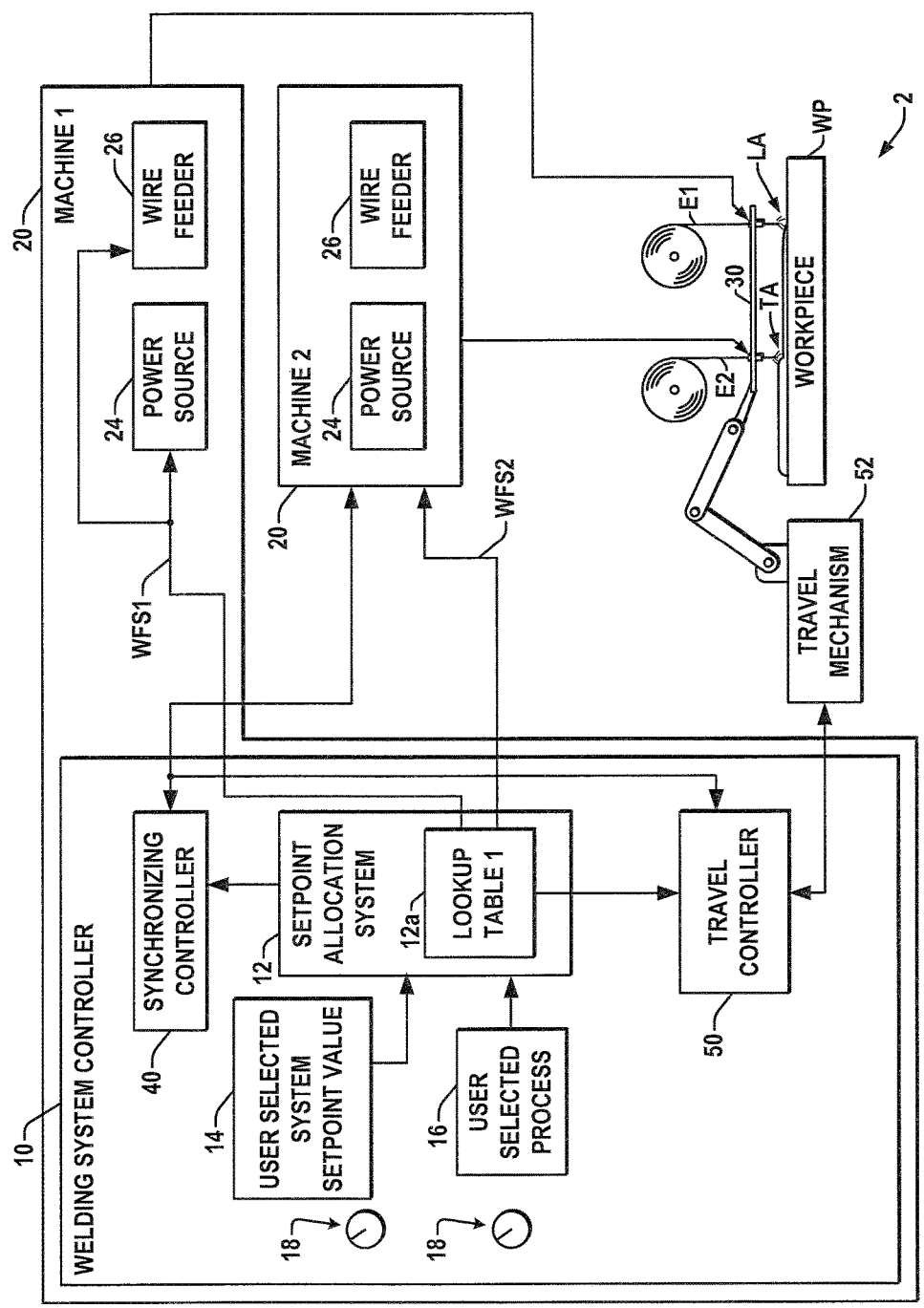
FIG. 22A is a partial schematic diagram showing another example of the welding system wherein the system controller and setpoint allocation system thereof are integrated in a system welding machine in accordance with further aspects of the invention.

The controller 10, moreover, may be implemented as any suitable configuration of hardware, software, firmware, or combinations thereof, and may be implemented in more than one device (e.g., can be implemented as a number of software components distributed across multiple servers or other interoperative devices), and in one possible embodiment, the system controller 10 and the setpoint allocation system may be integrated into one of the welding machines 20, as shown in FIG. 22A below. In this case, one of the machines 20 may be configured to operate as a system master with the other machines 20 possibly also having system controller functionality but being configured or otherwise designated to operate as slaves receiving individual machine setpoint values from the designated master machine 20.

The system controller 10 is also operative to receive user selected process information 16, for example, process type information, welding electrode size information, etc. As set forth in greater detail below, the welding system controller 10 comprises a setpoint allocation system 12 which is operative to derive welding machine setpoint values for the individual welding machines 20 of the system 2 based on the user selected setpoint value 14, wherein the derivation of the machine setpoints may, but need not, take into account information 16 regarding a specific desired or selected welding process or operation. In this regard, certain examples illustrated below provide lookup tables in the setpoint allocation system 12 to map user selected system setpoint values to machine setpoint values, with the lookup tables being partitioned according to welding process type and wire diameter, although this form of partitioning is not a requirement of the invention, and other implementations are possible, for example, where the system controller includes a non-partitioned lookup table, or a single lookup table or equation is downloadable to, or pre-programmed into, the controller 10 for a given process type and wire size, with the setpoint allocation system 12 merely deriving two or more machine setpoint values according to a single system setpoint value without consulting other information. In operation, the setpoint allocation system 12 divides or apportions the output setting 14 into the welding machine setpoint values for the welding machines 20, wherein the user selected system setpoint value 14 and the derived machine setpoint values may, but need not, be of the same type. For example, the user selected value 14 may be a total system deposition rate expressed in units of pounds per hour (lb./hr.), with the machine setpoints being wire feed speeds or other values.

The system 2 includes two or more individual welding machines 20, where FIG. 1B illustrates an integer number "n" such machines 20, with n being any positive integer greater than 1, and where each machine 20 is operatively coupled to receive a corresponding machine setpoint value from the system controller 10 and the setpoint allocation system 12 thereof. Each machine 20 has a power source 24 operable to provide a signal waveform output suitable for establishing a welding arc in a multiple arc process, and may have various regulation apparatus (not shown) to control the arc current and/or voltage waveform profile in a closed loop fashion. Any suitable form of power source 24 may be employed in the welding machines 20, and different machines 20 may include different types or forms of power sources 24 within the scope of the invention and the appended claims.

In one example, the power source 24 may be a switching power source as exemplified by the POWER WAVE or POWER MIG products sold by the Lincoln Electric Company, and as depicted in Blankenship U.S. Pat. No. 5,278,390, Stava U.S. Pat. No. 6,111,216, and other references incorporated by reference above. The exemplary machines 20 in system 2 also include wire feeders 26 and may optionally be provided with integrated or stand-alone control boxes (not shown), with suitable interconnections and/or communicative couplings between power source 24 and wire feeder 26 to form a welding machine 20. In one embodiment, power source 24 and wire feeder 26 may form a single device with integrated controls, such as the POWER MIG welders with integrated wire feeding mechanisms and user interfaces. Other embodiments may include separate power sources and wire feeders, such as the POWER WAVE model power source and POWER FEED model wire feeders manufactured and sold by Lincoln Electric, where the control box functions may be included in the wire feeder 26. In this regard, a welding machine control device or control box may be integrated or separately housed, and may provide local user interface features such as displays for indicating one or more process values or settings, or localized single-knob type adjustments described above, wherein suitable examples are sold by Lincoln Electric including separately housed control boxes and integrated control boxes included within wire feeders 26.

The exemplary multiple arc systems 2 described herein are operative to generate two or more independent welding arcs via the machine power sources 24, wherein wire feeders 26 may be employed in welding operations for which consumable welding electrodes are fed to the welding arcs. In operation, moreover, a user (not shown), may adjust the welding system output via a single system setpoint knob 18 associated with the system controller 10, for instance, a deposition rate control knob 18, so as to provide a system-wide setpoint value 14. The setpoint allocation system 12 derives the local setpoints or machine setpoint values from the system setpoint 14 according to a lookup table(s) or equation(s) associated with the controller 10 as illustrated and described further below, wherein localized adjustments, if needed, may be made at the control boxes of machines 20, for instance, using arc length or trim controls or the like, whereby the user may modify the individual arc characteristics.

Figure 2:
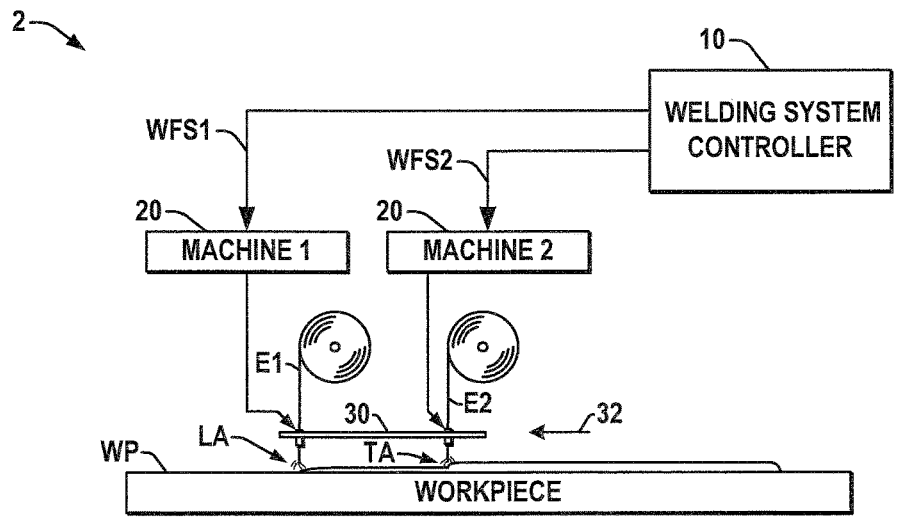
FIG. 2 is a partial schematic diagram showing the exemplary welding system used in performing a dual arc tandem welding process.

In the examples of FIGS. 1A, 1B, and 2, the user selects a system setpoint value 14, which is used by setpoint allocation system 12 to generate and integer number "n" wire feed speed machine setpoint values WFS1, WFS2, . . . , WFSn. The controller 10 then provides these machine setpoints WFS1, WFS2, . . . , WFSn to the corresponding welding machines 20 (e.g., indicated as MACHINE 1, MACHINE 2, . . . , MACHINE n in the various figures). Machines 20, in turn, individually provide a welding signal waveform to create a corresponding welding arc according to the machine setpoint values WFS to set a total output of the multiple arc welding system 2. Although wire feed speed machine setpoints are used to illustrate the various concepts of the invention, it will be appreciated that the invention and the appended claims are not limited to a particular type or form of machine setpoint, wherein other machine setpoint values are possible, including but not limited to wire feed speeds, welding currents, welding voltages, etc, wherein different machines 20 can be provided with different types of machine setpoints within the scope of the invention and the appended claims. In the example of FIG. 2, the user selected setpoint 14 is a deposition rate for adjusting the total wire feed speed (or deposit rate) of the multiple arc system 2, wherein a lookup table or equation or other algorithmic means is employed to essentially divide the desired deposition rate into individual wire feed speed settings WFS for each of the independent arcs.

Referring to FIGS. 2-5, the invention may be advantageously employed in tandem welding applications to allocate a system setpoint value across a lead arc welding machine 20 and one or more trailing arc machines 20. In this example, the system output setting (system setpoint value) is divided up into the welding parameters for the lead arc and one or more trailing arcs based on a user selected process or welding schedule. In this example, the machine setpoints may be suitably apportioned wire feed speed values from which the individual welding machines derive waveform parameters and other machine settings. Alternatively, the system controller 10 may itself derive the waveform parameters and provide these along with the wire feed speeds to the individual machines 20. The welding machines then provide individual welding signal waveforms and welding wire to create a corresponding welding arc in accordance with the machine setpoint value so as to set a total output according to the system setpoint. The tandem welding embodiment of FIG. 2 illustrates a dual arc tandem welding system 2 with first and second machines 20 and welding system controller 10 providing local setpoints WFS1 and WFS2 to the respective first and second machines 20. In this system, the machines 20 control individual first and second (e.g., leading and trailing) arcs LA and TA, respectively, where the welding equipment includes a common travel carriage or fixture 30 that moves the arcs and corresponding wire electrodes E1 and E2 along a horizontal path in the direction 32, with each arc and electrode providing deposited material to form a weld on an upper surface of a workpiece WP.

Figure 3:
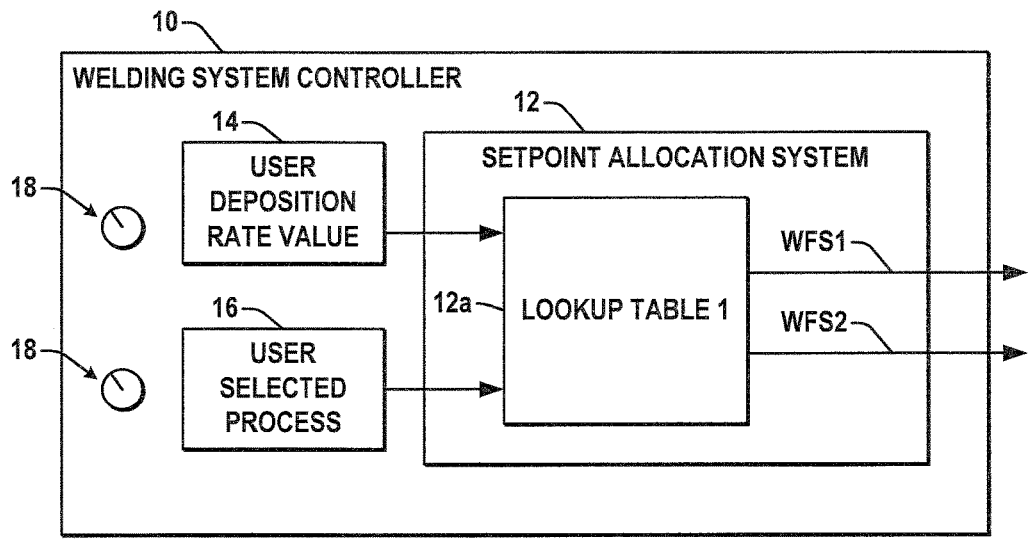
FIG. 3 is a simplified schematic diagram showing an exemplary welding system controller providing welding machine wire feed speed setpoint values based on a user defined deposition rate value using a lookup table.

Referring also to FIG. 3, the wire feed speed rates and power source waveforms to which the leading and trailing tandem machines 20 are controlled determine the overall deposition rate in the system 2, wherein correct adjustment of these control parameters may be critical to achieving a given desired system deposition rate, such as the user selected value 14 received by the setpoint allocation system 12. The system 12 may consult information 16 related to a user selected process, for example, such as a selected weld schedule file or data structure stored in the system controller 10 or information 16 otherwise obtainable by the setpoint allocation system 12, and the system 12 divides the selected deposition rate value 14 into the output settings (e.g., wire feed speeds WFS) for the lead arc LA and the trail arc TA. In one example, the lead arc LA is apportioned 60 percent and the trailing arc TA 40 percent with respect to wire feed speeds for similar first and second electrode wire diameters. Corresponding power source waveform parameters 29 (FIG. 8 below) would also be selected or otherwise derived from the machine wire feed speed values WFS, either by the setpoint allocation system 12 or the individual machines 20, or combinations thereof, and the individual machines 20 are then operated according to the derived wire feed speeds and waveform parameters.

Figure 4:
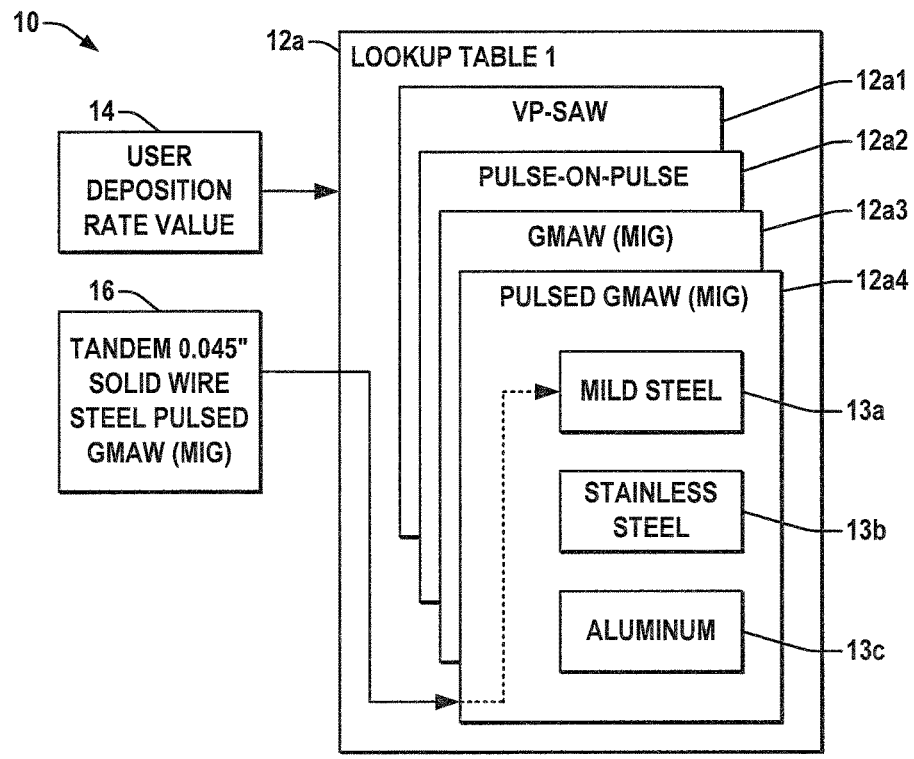
FIGS. 4 and 5 are schematic diagrams illustrating further details of the exemplary system controller lookup table, in which an appropriate portion of the lookup table is indexed according to a user selected process type and electrode material and welding machine wire feed speed values are obtained from the lookup table according to a user selected system deposition rate value.
Figure 5:
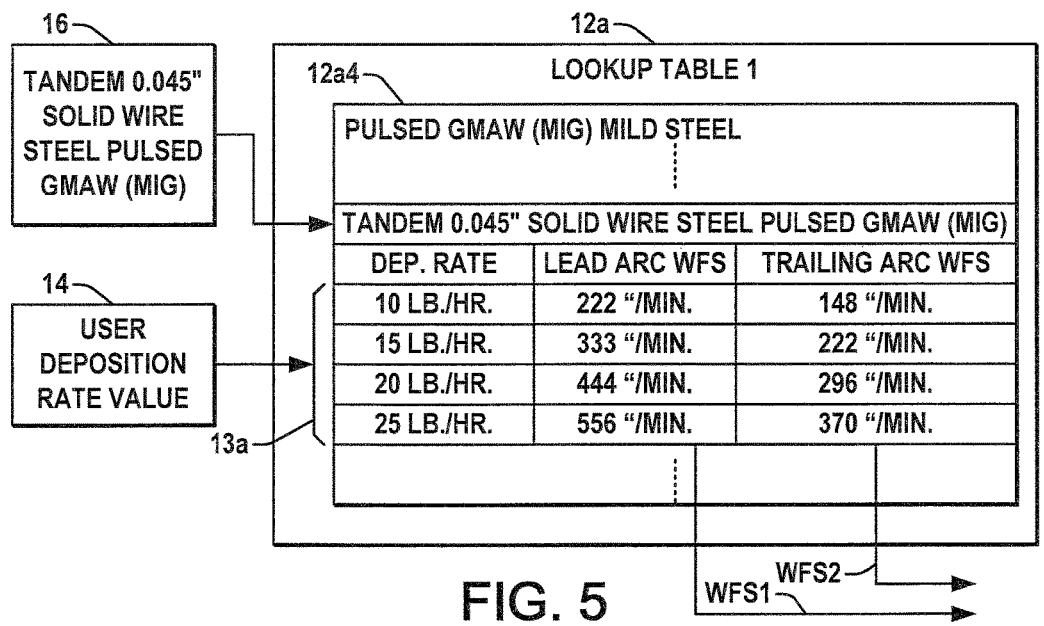

As shown in FIG. 3, the setpoint allocation system 12 in one embodiment comprises a lookup table 12a (LOOKUP TABLE 1 in the figures) that maps the system setpoint value 14 to the first and second welding machine setpoint values WFS1 and WFS2. As shown in FIGS. 4 and 5, one embodiment of lookup table 12a includes different mappings of system and machine setpoint values for different processes. In this embodiment, the setpoint allocation system 12 receives the user selected system deposition rate setpoint value 14 and searches a process specific portion of the table 12a that is determined based on the user selected process information 16, where the information 16 may be obtained by a user setting a knob 18 or other user interface selection apparatus associated with the welding system controller 10 (e.g., menu driven process selection display and keyboard, etc.), or may be downloaded to the controller 10 from an external device (e.g., through a network or other communications means). Other implementations are possible, for example, in which the relevant portion of table 12a is downloaded into the system controller 10, in which case the setpoint allocation system 12 need not consult process specific information 16.

To illustrate the table indexing concept, the exemplary lookup table 12a is shown in FIG. 4 including several portions 12a1, 12a2, 12a3, and 12a4, each having a plurality of entries (e.g., shown as rows in the figures) corresponding to variable polarity submerged arc welding (VP-SAW), pulse-on-pulse welding, gas metal arc welding (GMAW or metal inert gas (MIG) welding), and pulsed GMAW processes, respectively, although the invention is not limited to any particular welding process types, wherein the illustrated types are merely examples. FIGS. 4 and 5 illustrate the case for a pulsed GMAW process, wherein the table portion 12a4 is consulted by the setpoint allocation system 12 according to the process information 16 indicating a tandem pulsed GMAW process using 0.045 inch diameter solid welding wire for welding mild steel workpieces. Table portion 12a4 includes sub portions 13a-13c corresponding to mild steel, stainless steel, and aluminum workpiece materials, respectively, wherein the setpoint allocation system 12 searches the deposition rate entries of the mild steel sub portion 13a based on the user specified deposition rate value 14, wherein any suitable lookup table searching technique may be employed, which may include linear or non-linear interpolation and/or extrapolation, to determine first and second wire feed speed values WFS1 and WFS2 corresponding to a given system deposition rate 14, with the derived wire feed speeds WFS1 and WFS2 being provided to the respective first and second welding machines 20 (FIG. 2).

Figure 6:
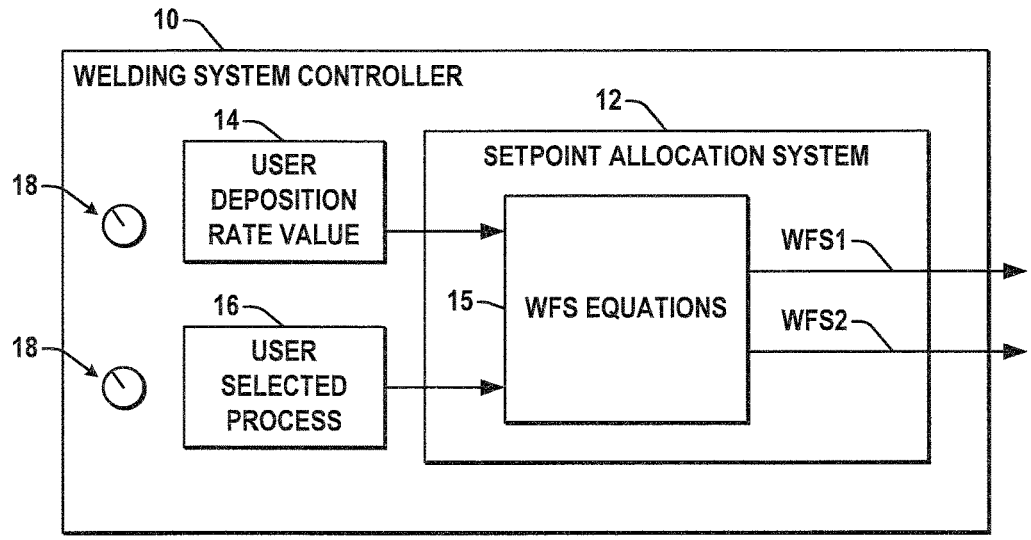
FIGS. 6 and 7 are schematic diagrams illustrating another implementation of the system controller in which equations or algorithms are used to derive welding machine wire feed speed values based on a user selected system deposition rate value.
Figure 7:
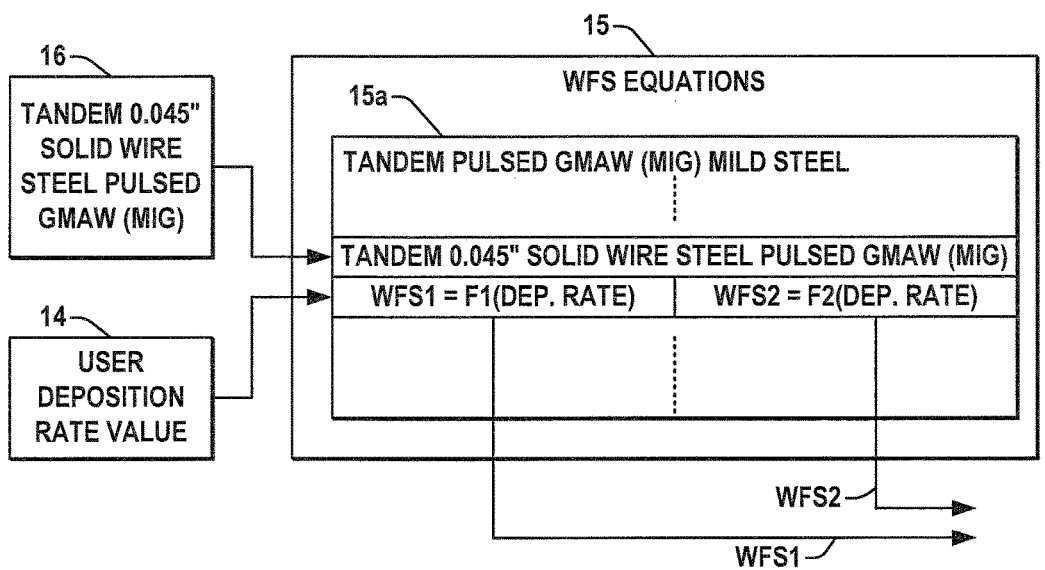

Referring also to FIGS. 6 and 7, other setpoint allocation system implementations are possible, for example, in which the setpoint allocation system 12 solves at least one equation or algorithm 15 to obtain the machine setpoint values WFS1 and WFS2 based on the system deposition rate setpoint value 14. In the illustrated example, the allocation system 12 provides a number of process related equations or algorithms 15, wherein the system 12 uses the process information 16 to select a pair of equations 15a (FIG. 7) corresponding to the selected mild steel pulsed GMAW tandem welding operation. The exemplary equations 15a provide a first relationship characterizing the lead or first wire feed speed WFS1 as a function (F1) of the system deposition rate value 14. Another equation 15a relates the trailing or second wire feed speed WFS2 as a function of the deposition rate value 14. Other implementations are possible, for instance, where a single equation 15 is a function of deposition rate value 14 as well as other variables, such as one or more of the process information values 16 (e.g., wire diameter, process type, etc.).

Figure 8:
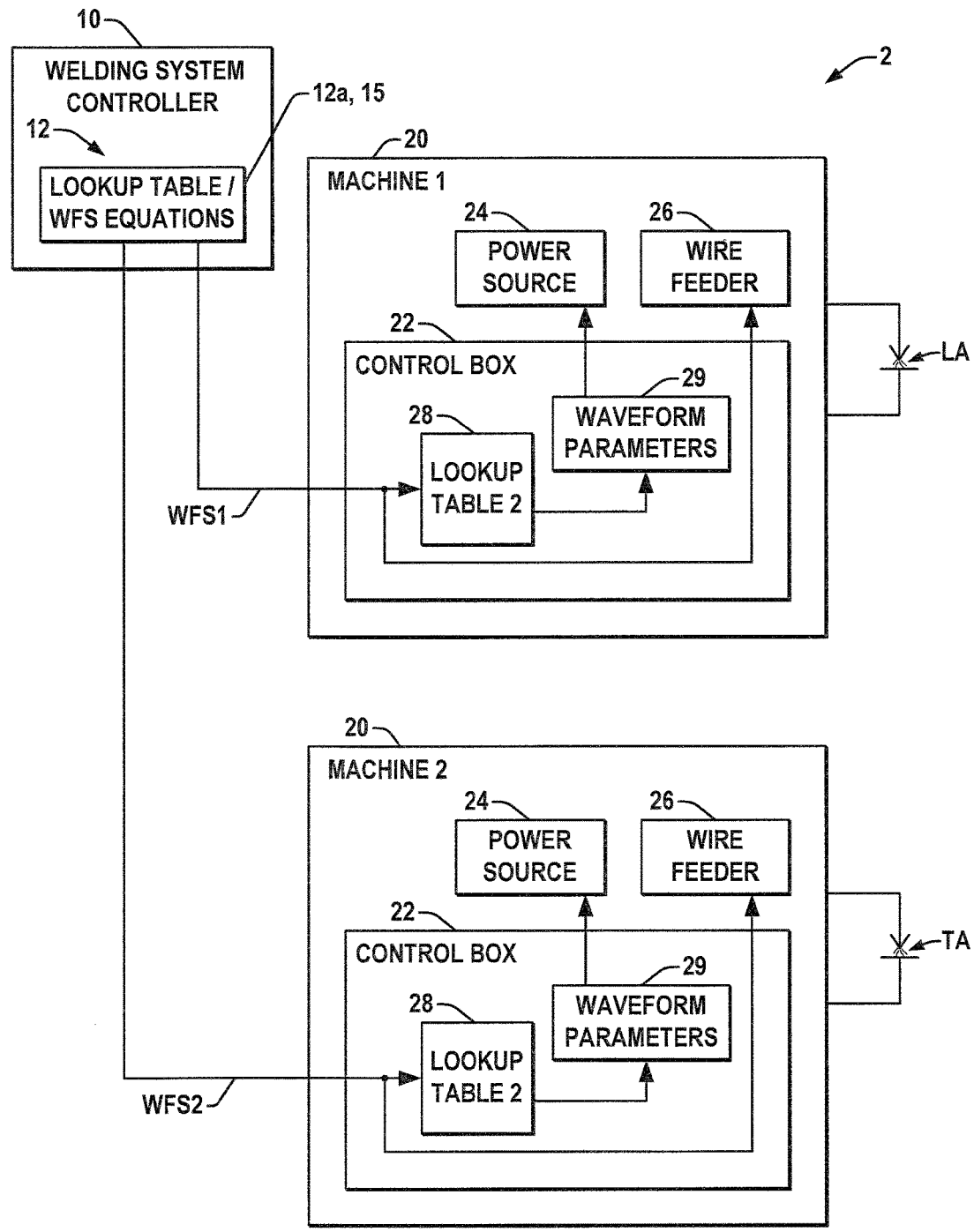
FIG. 8 is a schematic diagram illustrating an exemplary implementation of the tandem welding system in which the welding system controller provides wire feed speed setpoint values to the welding machines, and the welding machines derive welding waveform parameters for the machine power sources.
Figure 9:
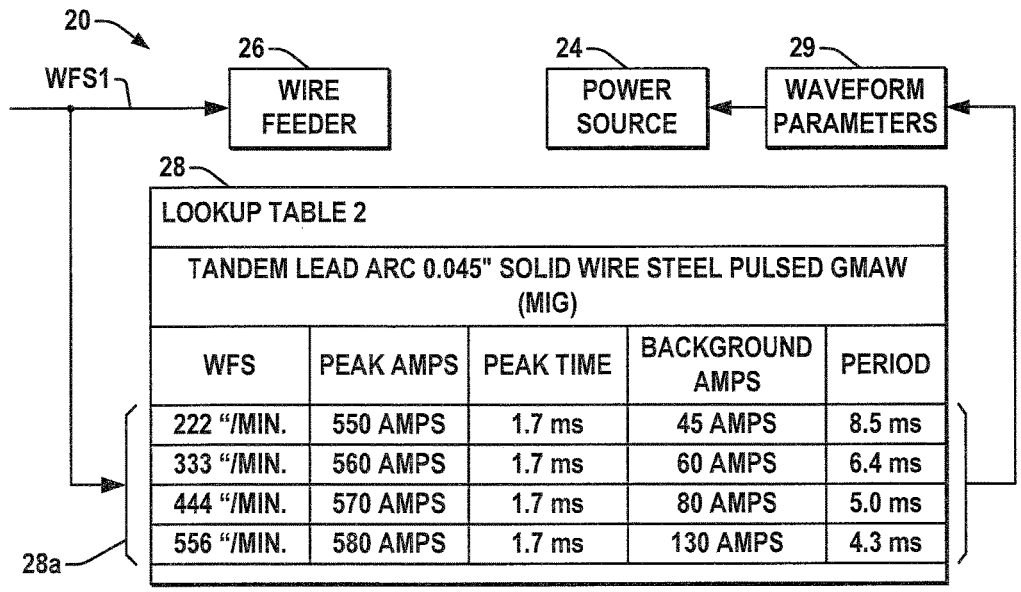
FIGS. 9 and 10 are schematic diagrams illustrating further details of the exemplary lookup tables in the welding machines for deriving power source waveform parameters based on wire feed speed machine setpoint values provided by the system controller.
Figure 10:
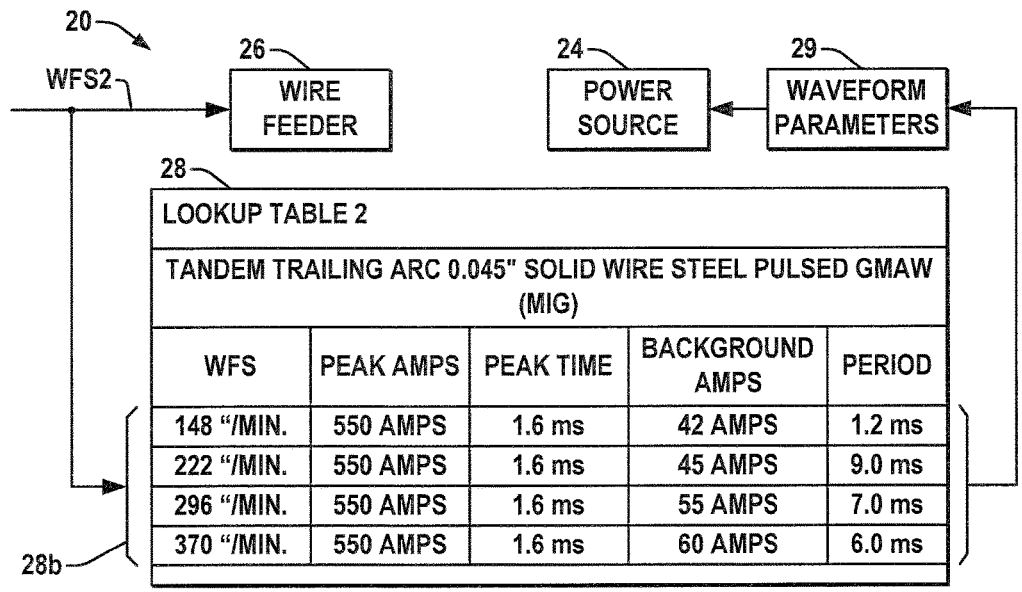

Referring also to FIGS. 8-11, the welding system controller 10 and the setpoint allocation system 12 thereof provide the derived first and second wire feed speed welding machine setpoint values WFS1 and WFS2 to the respective first and second machines 20, and these values are used by the respective wire feeders 26 thereof. In one embodiment, the setpoint values WFS are provided to the control boxes of the machines 20, which in turn derive power source waveform parameters 29 therefrom and provide the waveform parameters 29 to the power sources 24. In the example of FIG. 8, the control boxes 22 of the machines 20 include lookup tables 28 from which the waveform parameters 29 are obtained according to the setpoint values WFS. In the illustrated implementations, the waveform parameters 29 for the selected pulsed GMAW tandem welding process include peak amps, peak time, background amps, and period, that define the welding pulse waveform profile provided in the output signal of the power source 24 to create the first and second arcs LA and TA, respectively, although other single parameter or sets of parameters 29 may be derived according to the machine setpoint value (WFS), which may depend upon the type of welding process selected and/or other factors, wherein the lookup table 28 may include suitable entry columns to accommodate any number of parameters values 29. As best shown in FIGS. 9 and 10, a first table portion 28a may be employed to ascertain the parameters 29 for the lead arc in the first machine 20 according to the wire feed speed WFS1, and a different table portion 28b is consulted to ascertain the parameters 29 for the trailing arc machine 20, wherein the machines 20 may, but need not, include the same table 28, with different portions being used according to whether the machine 20 is configured as lead or trailing arc in the tandem system 2.

Figure 11:
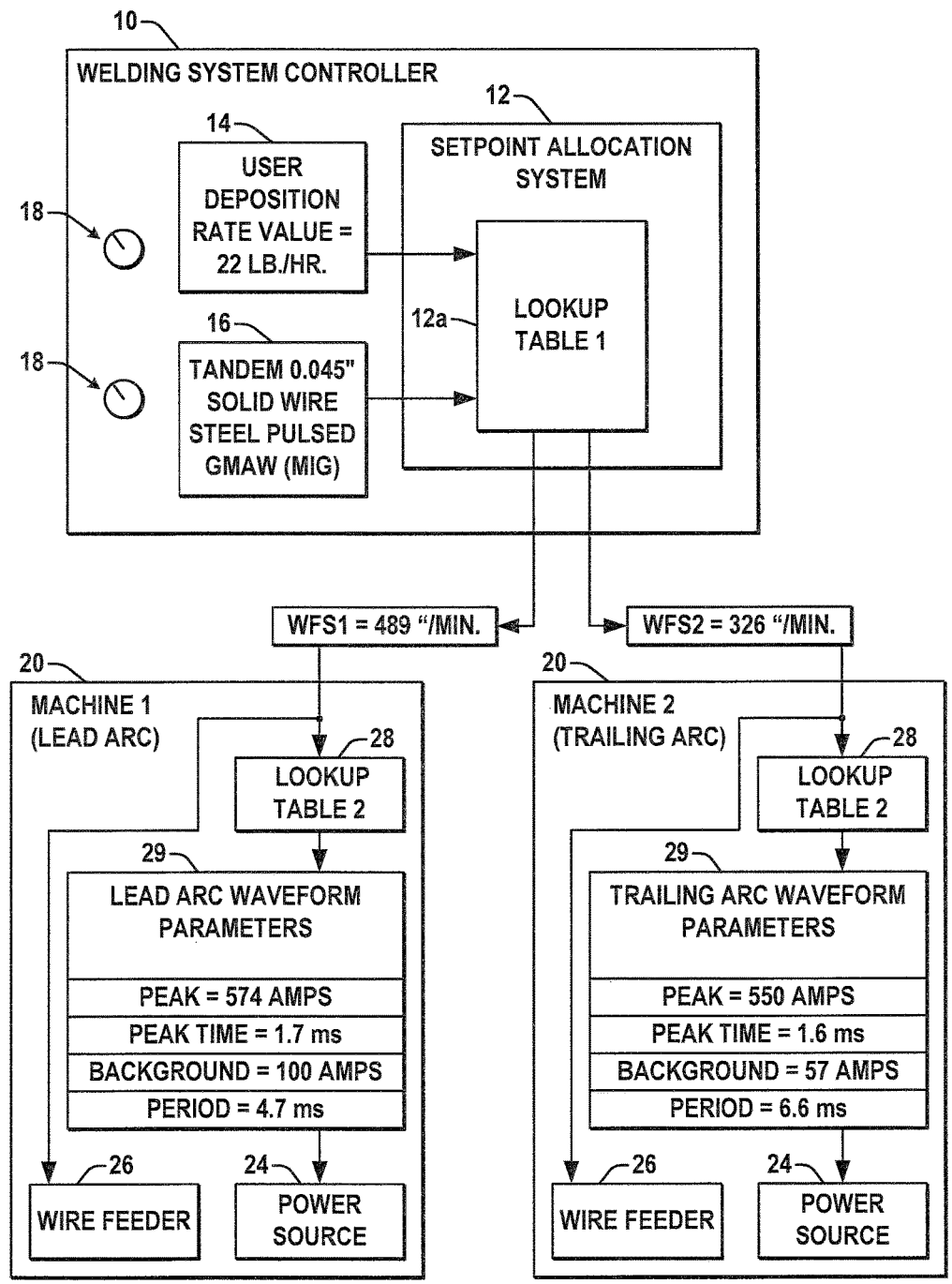
FIG. 11 is a schematic diagram showing the exemplary welding system for a specific example employing a user selected deposition rate of 22 lb./hr., with the welding machines obtaining waveform parameters from the machine wire feed speed values.

FIG. 11 illustrates a specific example in the case of lookup table 12a in the system controller 10 and tables 28 in the individual machines 20, in which a user selects a deposition rate 14 of 22 lb./hr. for the pulsed GMAW tandem process. In this case, the setpoint allocation system 12 uses lookup table 12a to derive the first and second wire feed speed values of 489 inches per minute (WFS1) and 326 inches per minute (WFS2) and provides these machine setpoint values to the first and second machines 20, respectively. These values are then provided to the wire feeders 26 as well as to the local waveform parameter lookup tables 28 within the machines 20. In the first (leading arc) machine 20, the value WFS1 of 489 inches per minute is applied to the first portion 28a (FIG. 9) of table 28, and interpolation is used to obtain lead arc waveform parameters 29 (FIG. 11) including a peak amperage value of 574 amps, a peak time of 1.7 ms, a background current value of 100 amps, and a pulse period of 4.7 ms. In the second machine 20, the trailing arc wire feed speed WFS2 is applied to the second portion 28b (FIG. 10) of table 28 (with interpolation) to yield trailing arc waveform parameters 29 (FIG. 11) comprising a peak amps value of 550 amps, a peak time of 1.6 ms, a background current value of 57 amps, and a pulse period of 6.6 ms.

Figure 12:
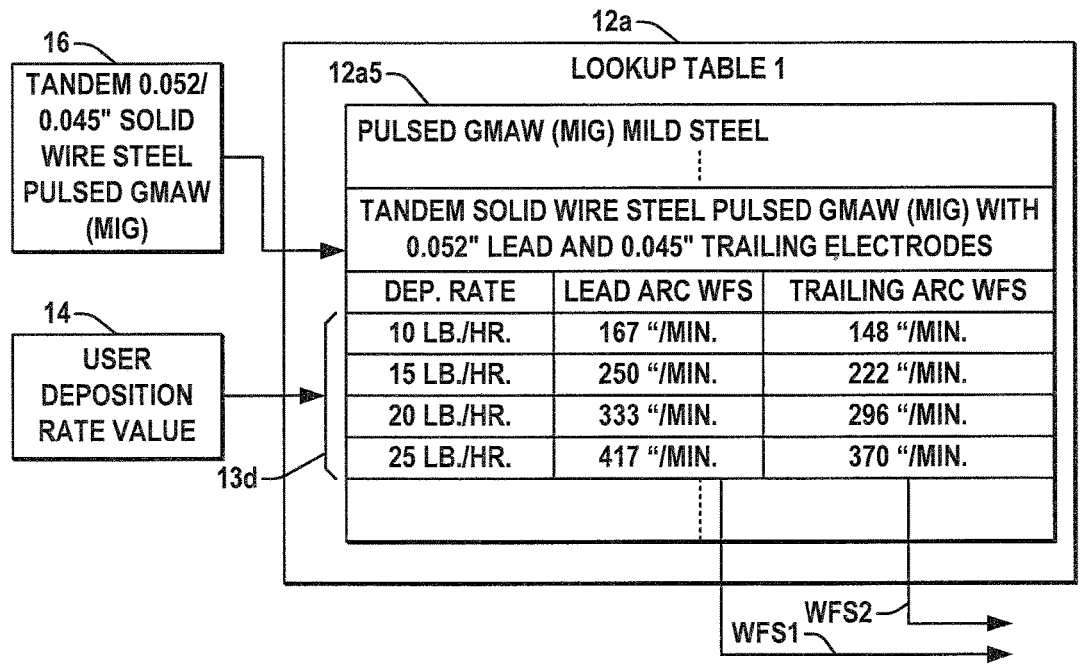
FIG. 12 is a schematic diagram illustrating a portion of the exemplary welding system controller lookup table for a tandem welding process using different wire diameters for the leading and trailing arcs.
Figure 13:
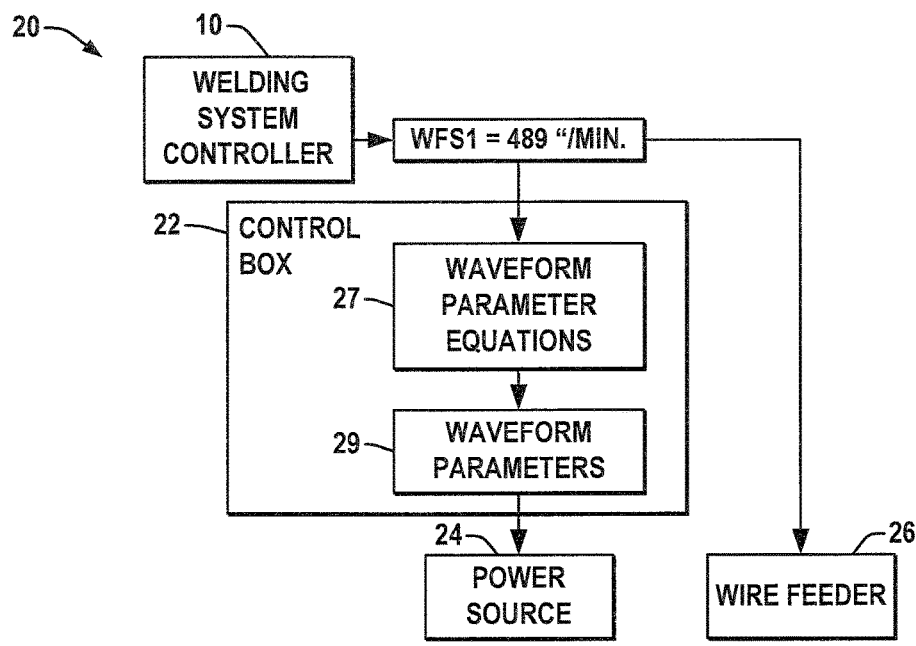
FIG. 13 is a simplified schematic diagram illustrating an exemplary welding machine control box employing one or more equations or algorithms to derive power source waveform parameters based on the wire feed speed value obtained from the welding system controller.

Referring briefly to FIGS. 12 and 13, another example is illustrated for a tandem pulsed GMAW process that uses different welding wire diameters for the lead and trail arcs in the system 2. In this example, another portion 12a5 and sub portion 13d of table 12a are employed by the setpoint allocation system 12 corresponding to a lead arc wire diameter of 0.052 inches and a trailing arc wire diameter of 0.045 inches for this process type, wherein the values employed in the lookup table 28 (or equations/algorithms 15 in FIGS. 6 and 7 above) may be configured to accommodate a variety of different welding process alternatives, including differences in wire diameters, welding process types, etc., in a multiple arc welding system 2. FIG. 13 illustrates another embodiment of the waveform parameter derivation in the control boxes 22 of the welding machines 20, wherein one or more waveform parameter equations 27 are used to generate the power source waveform parameters 29.

Figure 14:
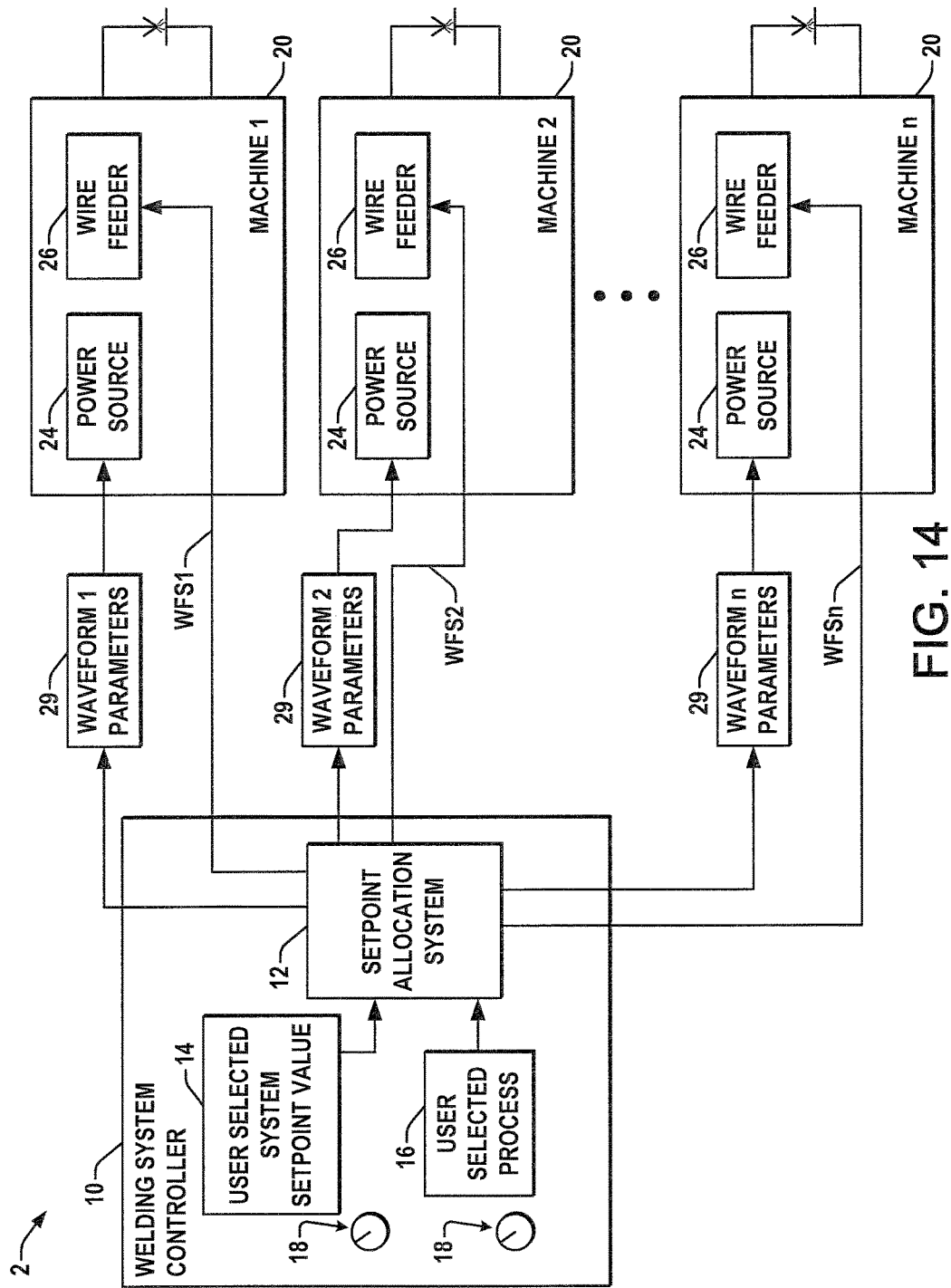
FIGS. 14 and 15 are schematic diagrams illustrating another implementation of the welding system and system controller aspects of the invention, in which the setpoint allocation system in the system controller receives a user selected setpoint value and derives welding machine wire feed speed setpoint values and power source waveform parameters therefrom.
Figure 15:
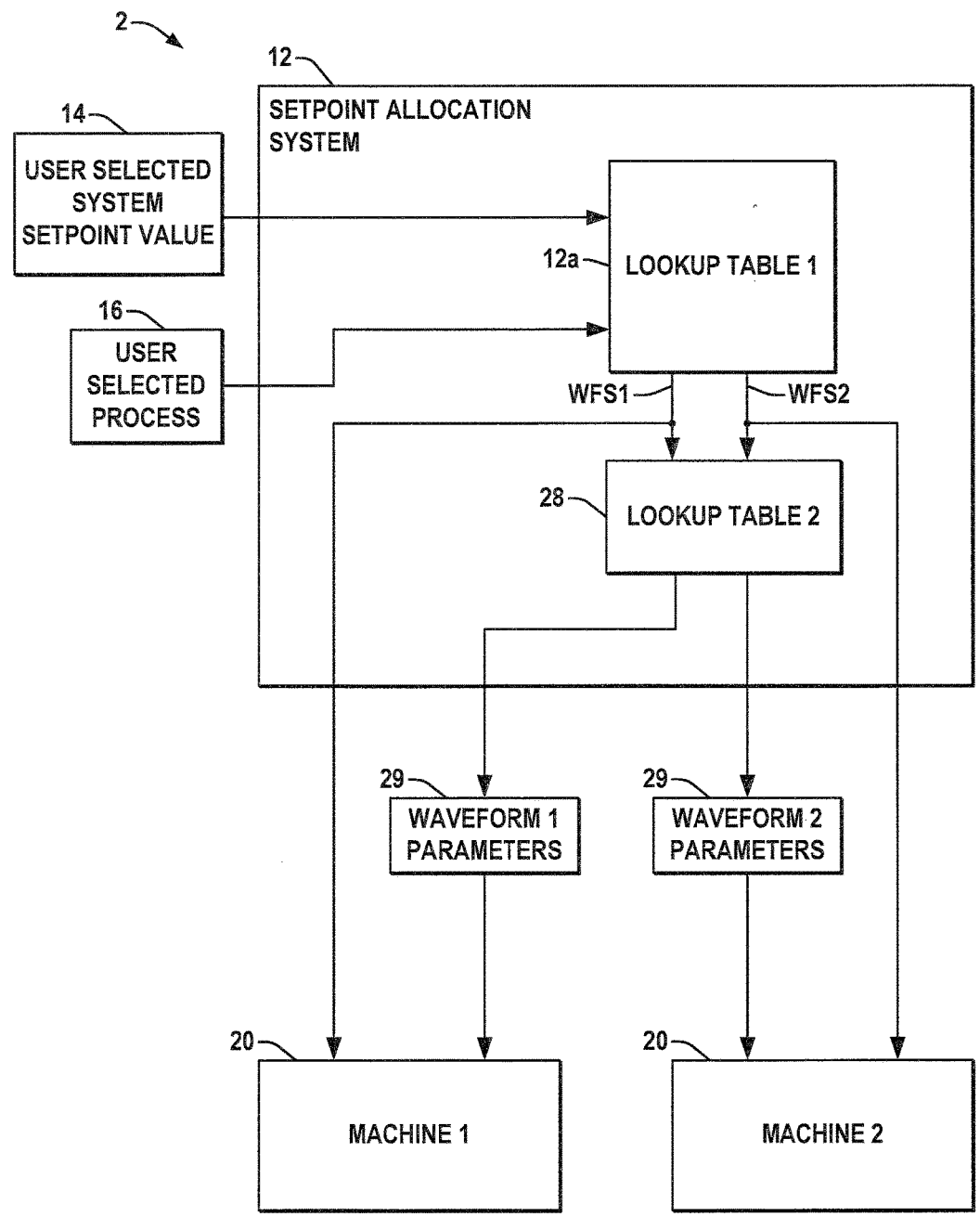

Referring now to FIGS. 14 and 15, another exemplary embodiment of a multiple arc welding system 2 is shown in which the welding system controller 10 receives a user selected system setpoint value 14 (and optionally receives process information 16), and the setpoint allocation system 12 thereof divides the system setpoint 14 using lookup table 12a, equations 15, or other suitable techniques such as those described above to derive two or more machine setpoint values, such as wire feed speeds WFS1-WFSn in FIG. 14. In addition, the setpoint allocation system 12 itself derives the welder power source waveform parameters 29, either directly from the user selected system setpoint value 14 or from the derived machine setpoint values WFS, and provides the waveform parameters 29 and wire feed speeds WFS to the individual machines 20. In the example of FIG. 15, the setpoint allocation system 12 uses a lookup table 12a as described above to obtain the machine wire feed speed values WFS for the machines 20, and uses these wire speed values together with a second lookup table 28 (e.g., similar to the table 28 described above in the machines 20 of FIGS. 9-11) to derive first and second sets of power source waveform parameters 29, which are thus directly or indirectly based on the system setpoint value 14. The allocation system 12 provides the derived waveform parameters 29 to the welding machines 20 along with the individual wire feed speed setpoints WFS. In another possible embodiment, the tables 12a and 28 may be combined into a single table, or any number of tables could be used, or one or more equations/algorithms 15,27 could be employed, or combinations thereof, such as those described above.

Figure 16:
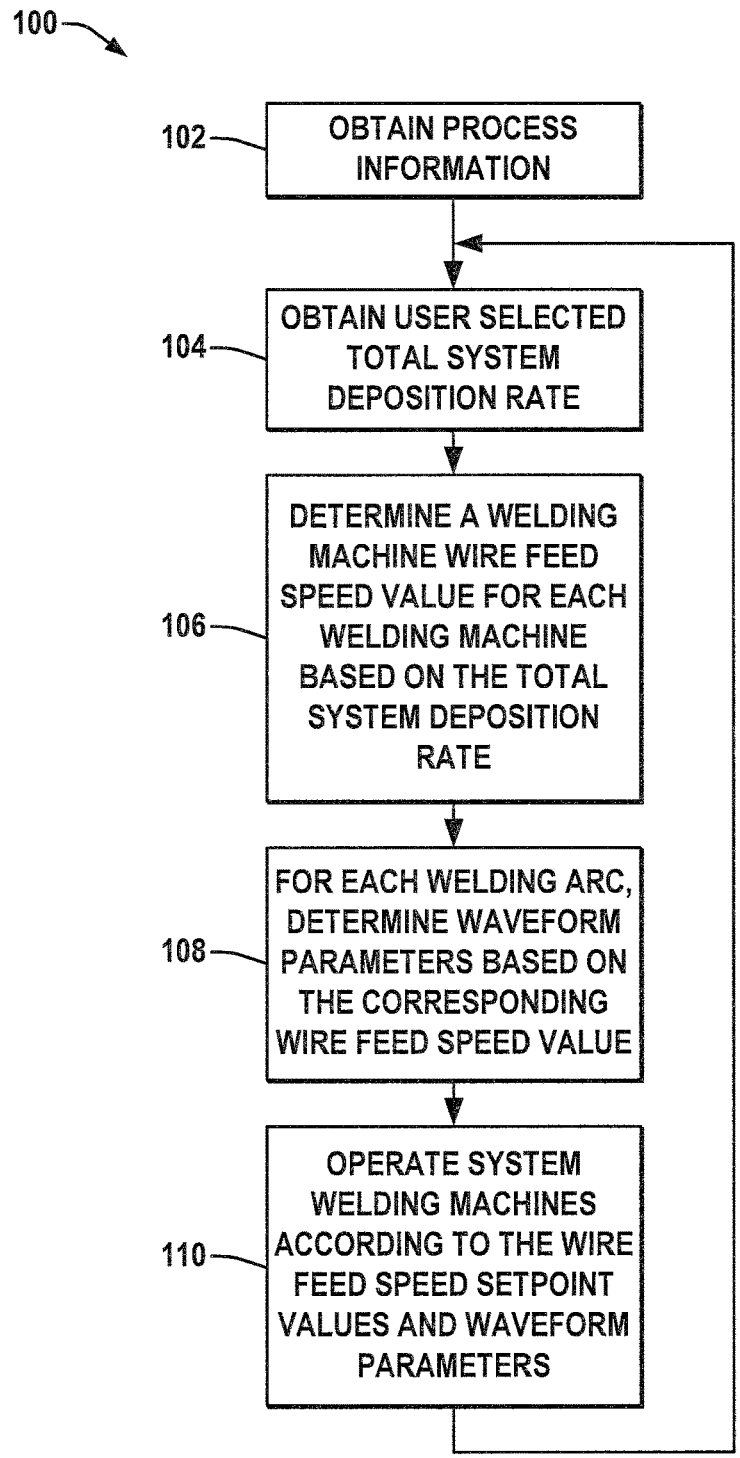
FIG. 16 is a flow diagram illustrating an exemplary process for controlling two or more welding machines according to a single user selected system setpoint value in a multiple arc welding system according to the invention.

Referring now to FIG. 16, another aspect of the invention provides methods for controlling first and second welding machines (e.g., machines 20 above) according to a single user selected system setpoint value (setpoint value 14), wherein FIG. 16 shows an exemplary method or process 100 for generating wire feed speeds WFS and waveform parameters 29 from the system deposition rate 14. Although the method 100 is illustrated and described hereinafter as a series of acts or events, it will be appreciated that methods of the invention are not limited by the illustrated ordering of such acts or events. In this regard, some acts or events may occur in different orders and/or concurrently with other acts or events apart from those illustrated and described herein, in accordance with the invention. It is further noted that not all illustrated steps may be required to implement a process or method according to the present invention. The methods of the invention, moreover, may be implemented in association with the illustrated multiple arc welding systems 2 and setpoint allocation systems 12, as well as with other apparatus and or systems not illustrated or described, wherein all such alternatives are contemplated as falling within the scope of the invention and the appended claims. Process information is optionally obtained at 102 and a user selected system setpoint value is obtained at 104, such as by allowing a user to adjust a user interface knob 18 (e.g., FIG. 1B above) or via a download operation or other suitable technique. At 106, local welding machine setpoint values (e.g., wire feed speeds) are determined for two or more welding machines 20 in the system 2 based on the system setpoint value 14 obtained at 104. The exemplary method 100 also includes determining waveform parameters (e.g., parameters 29) at 108 based on the machine setpoints (e.g., wire feed speeds) or directly from the user selected system setpoint 14, and operating the system welding machines 20 at 110 according to the machine setpoint values to set a total output of the multiple arc welding system 2 according to the system setpoint 14. The steps 104-110 may thereafter be repeated as described above in continuous fashion, whereby the user may again adjust the system output setpoint 14 with the method 100 (and system 2 above) providing corresponding adjustments to the welding machine feed speed setpoints.

Figure 17:
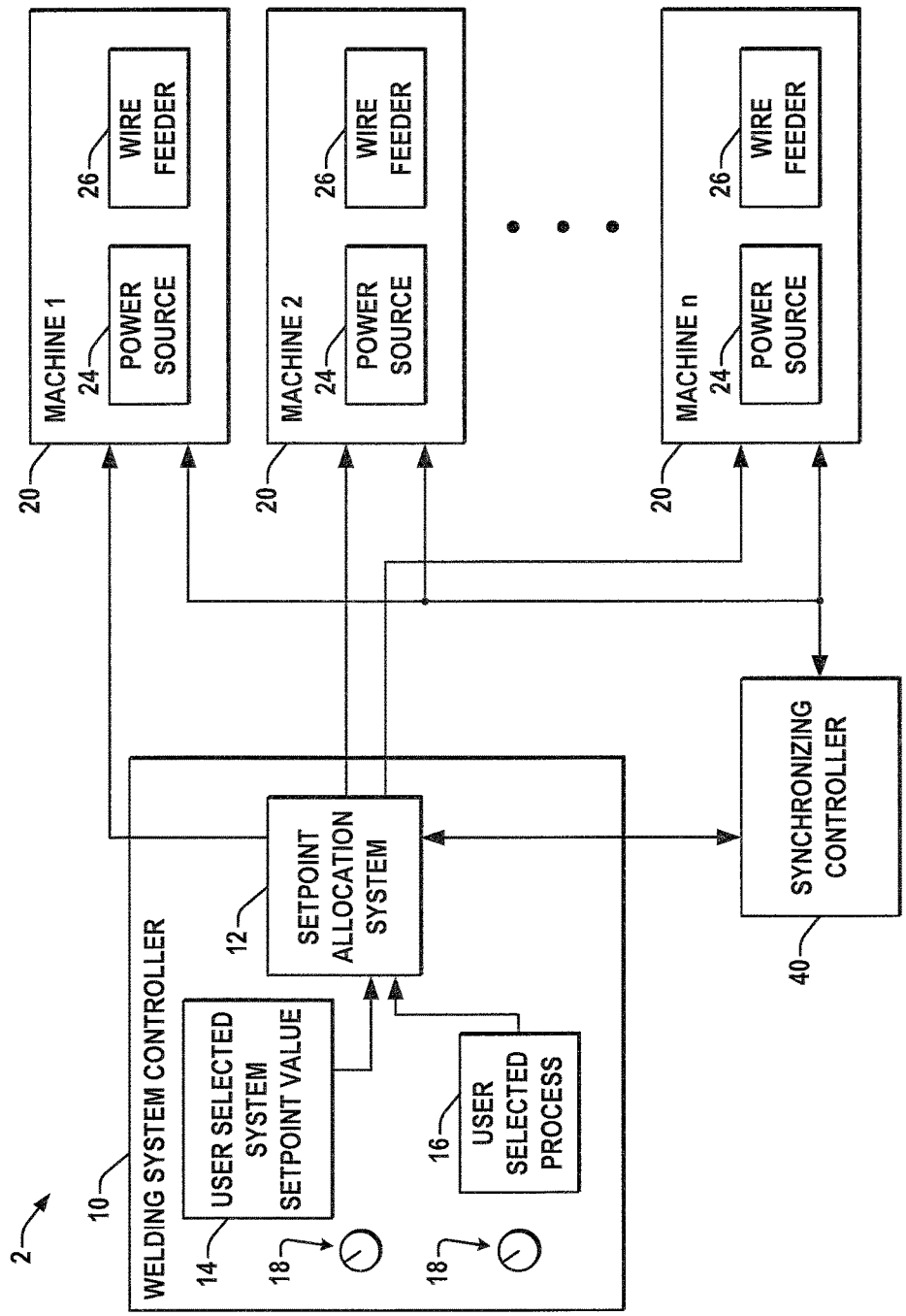
FIGS. 17 and 18 are schematic diagrams illustrating the multiple arc welding system with a synchronizing controller that receives a synchronizing frequency value from the setpoint allocation system of the system controller based on the user selected deposition rate setpoint value.
Figure 18:
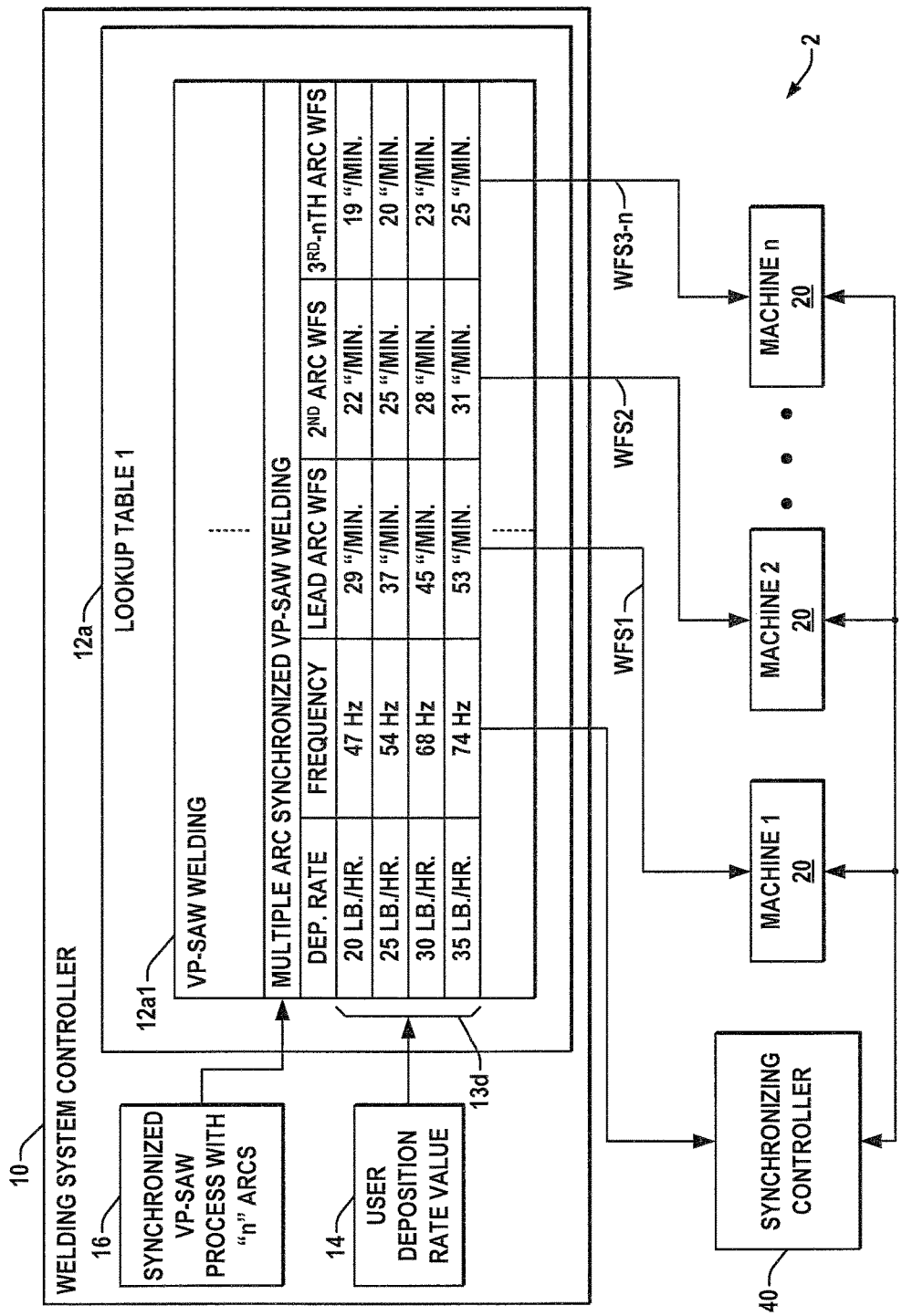
Figure 23:
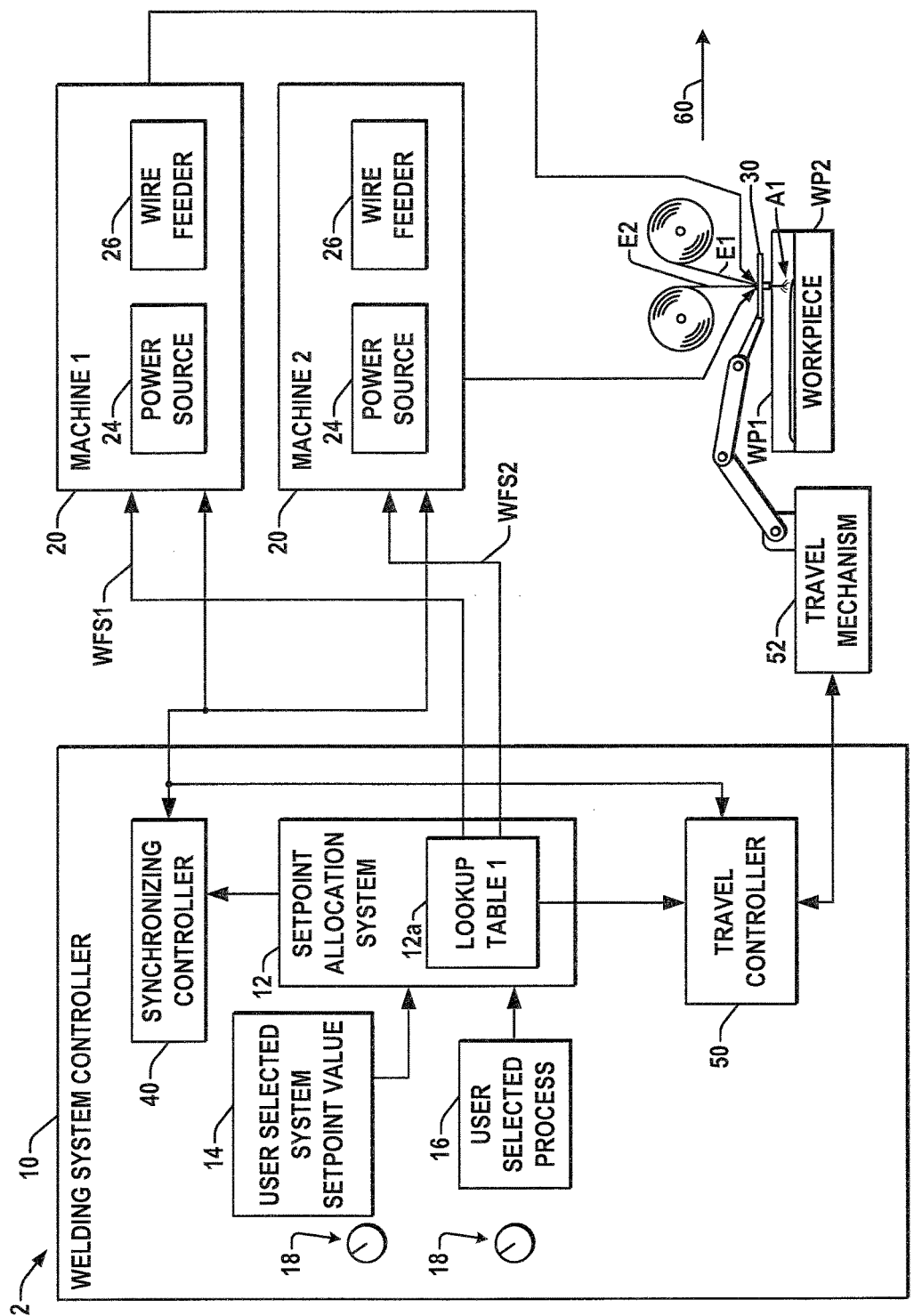
FIGS. 23 and 24 are schematic and partial sectional side elevation views, respectively, illustrating a multiple arc welding system of the invention employed in a dual fillet welding process to weld a stiffener member.

FIGS. 17 and 18 illustrate further aspects of the present invention, wherein the multiple arc system 2 includes a synchronizing controller 40 operatively coupled with the system machines 20 and the setpoint allocation system 12 of system controller 10, in which the synchronizing controller 40 operates to synchronize the welding machines 20. In this embodiment, the setpoint allocation system 12 derives one or more synchronizing values, such as frequency values to be provided to the system machines 20, based on the system setpoint value 14 and provides the synchronizing value to the synchronizing controller 40. As shown in FIGS. 22 and 23 below, moreover, the synchronizing controller 40 may be integrated into the welding system controller 10. As best illustrated in FIGS. 17 and 18, the synchronizing controller 40 receives a synchronizing value from the allocation system 12 and in turn provides synchronization signals, messages, etc. to the welding machines 20 of the system 2.

The synchronization can be any form of signals or messages by which the operation of two or more of the system welding machines 20 is coordinated or synchronized. For instance, as set forth in Stava U.S. Pat. No. 6,207,929 and Stava U.S. Pat. No. 6,291,798, incorporated by reference above, the synchronization by controller 40 may provide for adjusting the switching frequencies and/or phasing of the welding machine power sources 24, which may be set to the same value or to different values, for instance, to control arc interaction between neighboring welding arcs in the multiple arc system 2. In addition to modification or adjustment of the high frequency switching frequency of the power sources 24, the synchronizing control signals or messages from controller 40 may be employed to control the polarity switching or the time spacing of the peak currents in two or more of the power sources 24, for example, in variable frequency welding applications. In one embodiment using single polarity power sources 24, the synchronizing signal may be used to coordinate the pulse cycles produced by the machines 20, either to be synchronized (coincident) in time (in-phase), or to be staggered (adjacent arcs pulsed out of phase relative to one another), or other controlled phase relationships between two or more machines 20 and the power sources 24 thereof. In variable polarity applications, the synchronizing controller 40 may operate to coordinate the polarity and/or the pulse cycle produced by the machines 20. The synchronization, moreover, may be performed for any purpose, including but not limited to the above mentioned arc interaction reasons. In the example of FIG. 18, the lookup table 12a of the system controller 10 includes a column of frequency values, wherein the setpoint allocation system 12 determines a synchronization frequency value from the table 12a (e.g., using interpolation and/or extrapolation as needed) based on the user selected system setpoint (e.g., deposition rate) value 14, along with the various machine setpoints (WFS in this case), and provides the synchronizing frequency value to the synchronizing controller 40, which in turn coordinates the operation of the welding machines 20 in accordance therewith.

Figure 19:
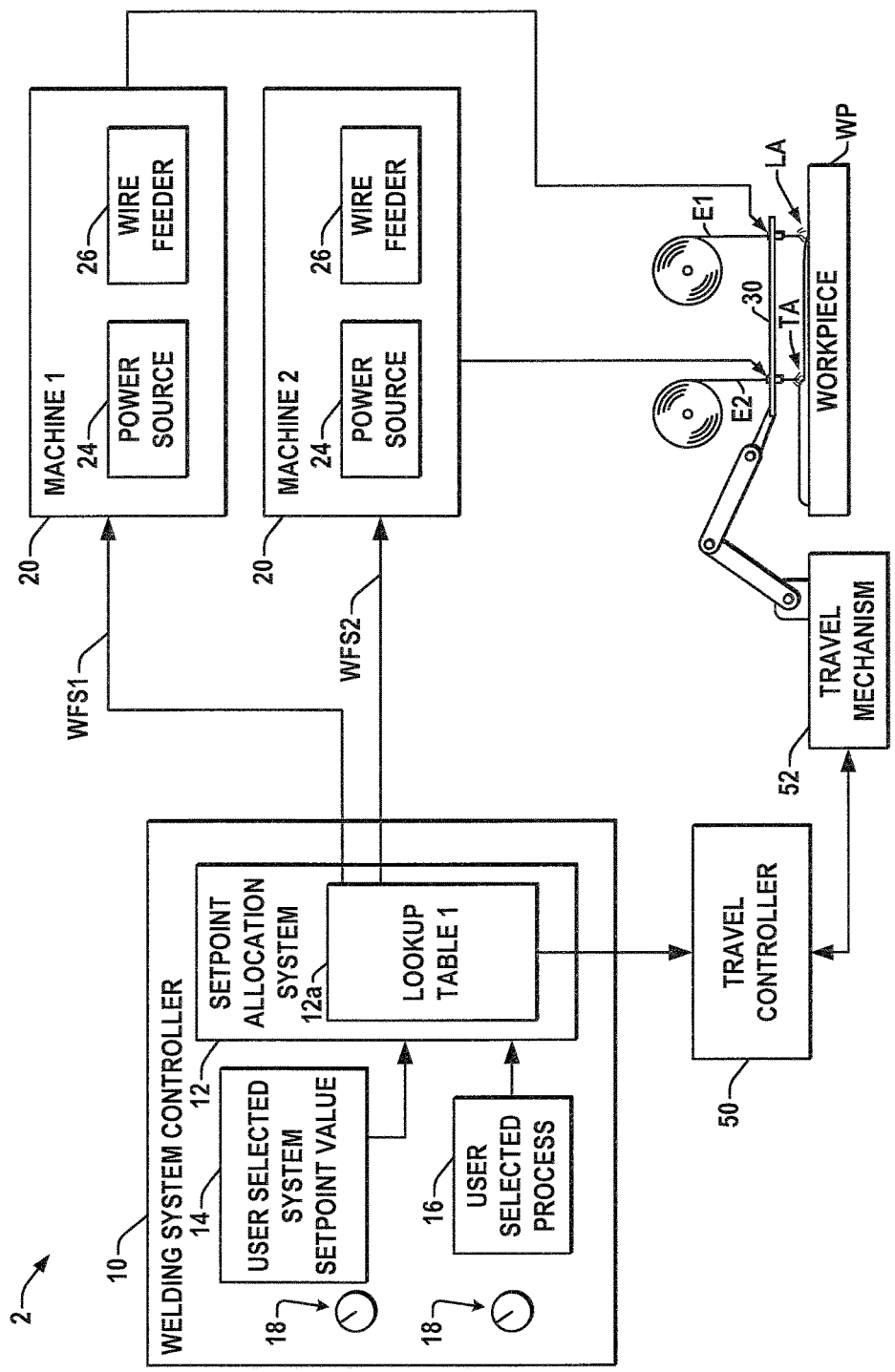
FIGS. 19 and 20 are schematic diagrams showing another embodiment of the welding system including a travel controller and travel mechanism providing robotic control of the welding electrode positions relative to the workpiece in a tandem welding application, with the setpoint allocation system providing a travel speed value to the travel mechanism controller based on a user selected weld size system setpoint value.
Figure 20:
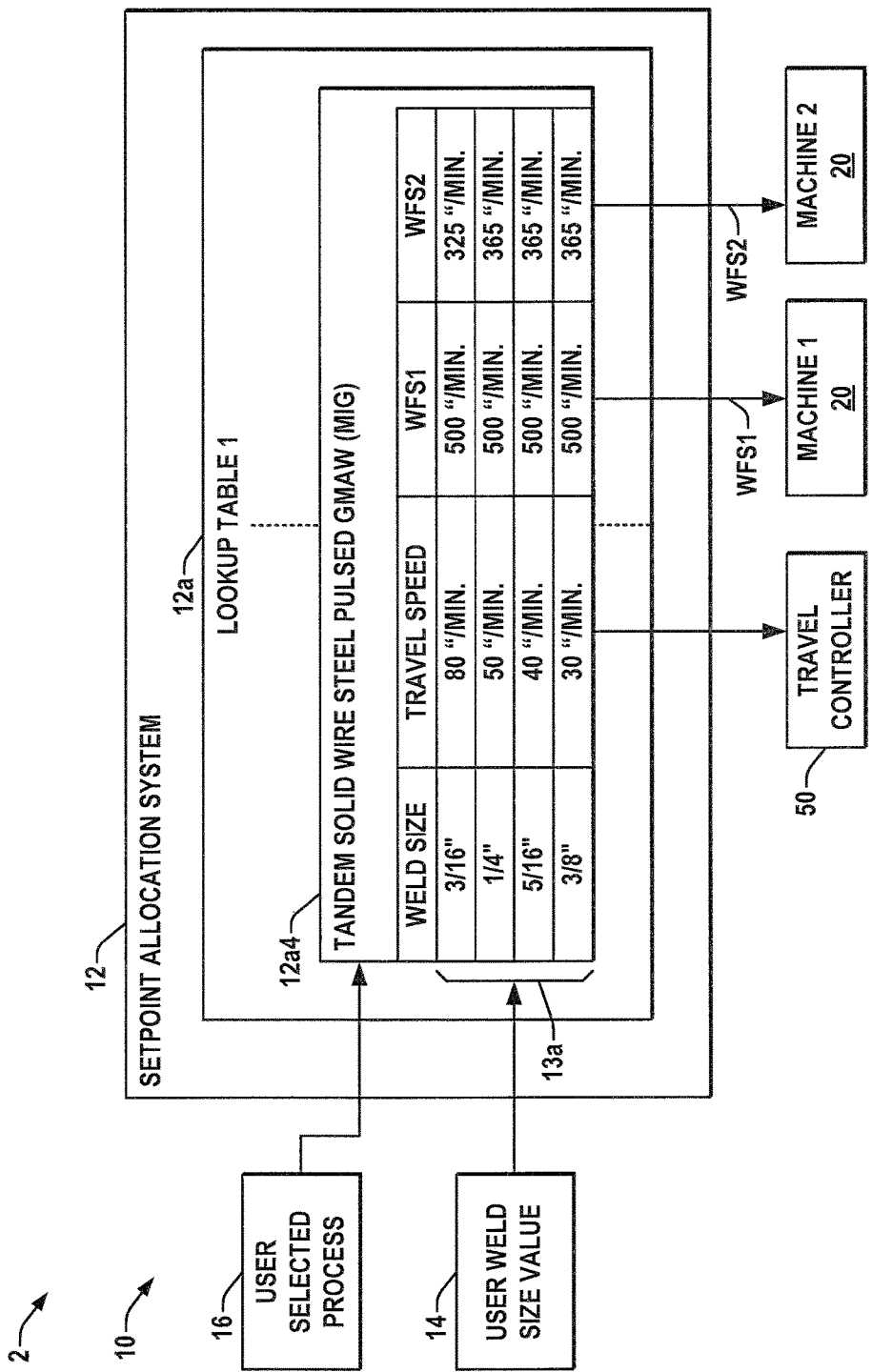
Figure 21:
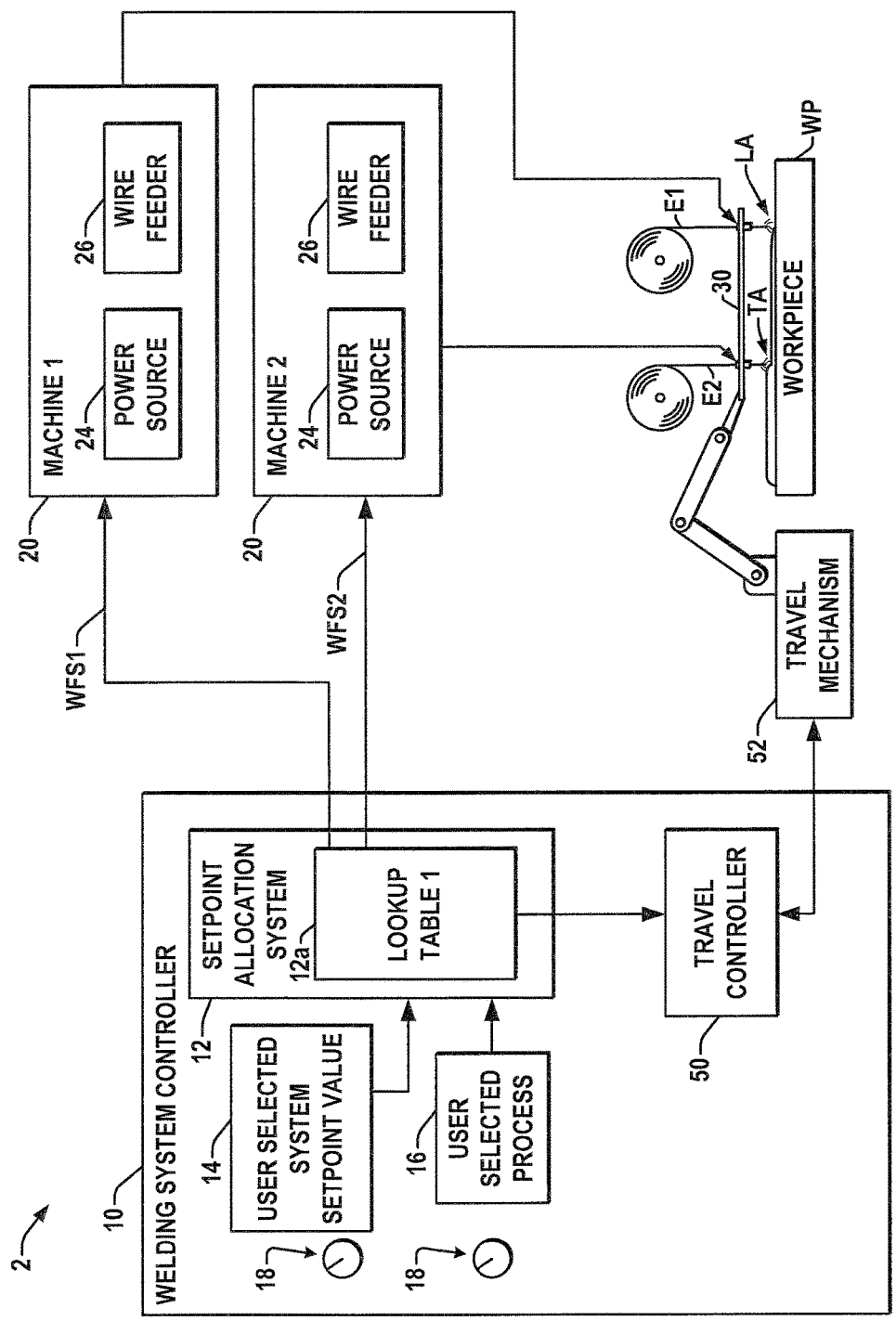
FIG. 21 is a partial schematic diagram illustrating the travel controller integrated in the system controller.

Referring now to FIGS. 19-21, the multiple arc welding system 2 may also include a travel controller 50 and a travel mechanism 52. The mechanism 52 is shown in FIG. 19 as a controlled mechanical robotic machine 52 that operates to control a spatial relationship between a workpiece WP being welded and one or both of the welding machines 20 (e.g., or portions thereof) by positioning a tandem welding travel carriage or fixture 30 relative to the workpiece WP. The system 2 further includes a travel mechanism controller 50 that controls operation of the travel mechanism 52, where the controller 50 can be any suitable control hardware, software, or combinations thereof. As best shown in FIG. 20, moreover, the setpoint allocation system 12 uses the user selected system setpoint 14 to derive one or more travel control parameters or values, and provides the travel control value(s) to the travel mechanism controller 50. As shown in FIG. 20, the allocation system lookup table 12a includes a column of travel speed values, and the setpoint allocation system 12 determines a travel control value (travel speed value) from the table 12a based on the user selected system setpoint. In this manner, the exemplary setpoint allocation system 12 coordinates the wire feed speeds of the welder machines 20 together with the travel carriage speed so as to achieve a targeted overall system weld size in the tandem welding example. In one embodiment of the system 2 shown in FIG. 21, moreover, the travel controller 50 is integrated into the welding system controller 10.

FIG. 22 shows another possible embodiment, in which a synchronizing controller 40 and a travel controller 50 are both integrated into the system controller 10. In yet another possible implementation illustrated in FIG. 22A, the welding system controller 10 and setpoint allocation system 12 thereof are integrated into one of the welding machines 20, which may, but need not, also include either or both of the synchronizing controller 40 and the travel controller 50. In this case, for example, more than one of the machines 20 could be equipped with a system controller 10 or the functionality thereof, as described above, with one of the machines 20 being configured as a master that implements the above described setpoint allocation functions by providing machine setpoints to the other machines 20, and may also provide synchronizing signals and/or messaging to the machines 20 via the integrated synchronizing controller 40 and/or travel control signals to the travel mechanism 52 via an integrated travel controller 50.

Figure 24:
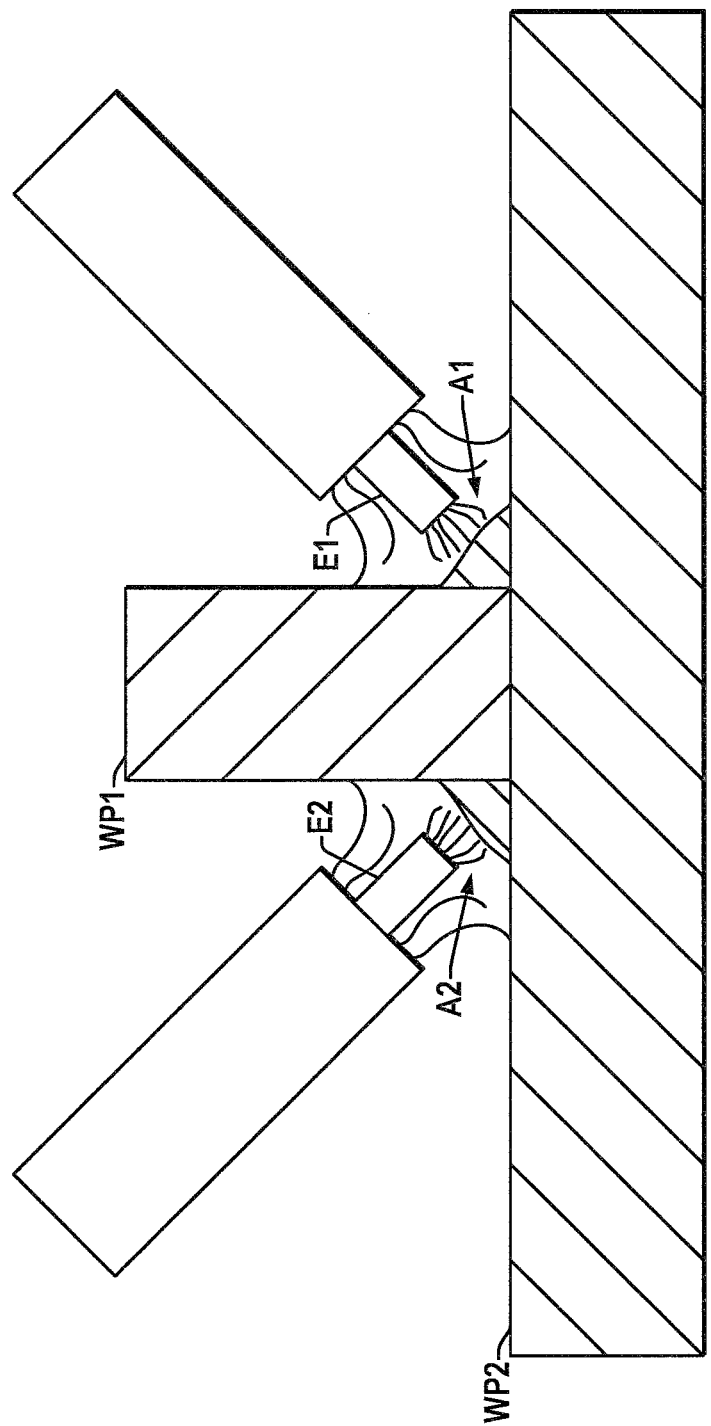

FIGS. 23 and 24 show another embodiment of the multiple arc welding system 2, configured to perform a dual fillet weld operation to weld a stiffener workpiece WP1 to a flat workpiece WP2. In this operation, two arcs A1 and A2 are provided by first and second machines 20, respectively, on opposite sides of the stiffener workpiece WP1, with the two fillet welds being perform simultaneously from both sides to join the workpieces WP1 and WP2 as the travel mechanism 52 moves the weld fixture 30 in the direction 60 (FIG. 23) In such applications, the same weld size is typically desired for both sides of the stiffener WP2, wherein the user selected system setpoint 14 may be a weld size, such as the vertical or lateral extent of the individual finished fillet welds, as shown in FIG. 24.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A multiple arc welding system, comprising:
   a first welding machine with a first power source for providing a first welding signal to create a first welding arc;
   a second welding machine with a second power source for providing a second welding signal to create a second welding arc; and
   a welding system controller with a setpoint allocation system, the setpoint allocation system receiving a user selected system setpoint value for selecting setting a total output of the multiple arc welding system, and the setpoint allocation system providing first and second welding machine setpoint values based on the system setpoint value to the first and second welding machines,
   wherein the system setpoint value is one of a deposition rate, a weld size, and a travel speed, and the total output is one of a total deposition rate, a total weld size, and a total travel speed of the multiple arc welding system,
   wherein each of the welding machines individually provide a welding signal waveform to create a corresponding welding arc according to a corresponding one of the welding machine setpoint values in order to set the total output of the multiple arc welding system according to the system setpoint value.

2. The multiple arc welding system as defined in claim 1, wherein the welding machines provide the welding arcs in a multiple arc tandem welding process.

3. The multiple arc welding system as defined in claim 1, wherein the setpoint allocation system comprises a lookup table mapping the system setpoint value to the first and second welding machine setpoint values.

4. The multiple arc welding system as defined in claim 1, wherein the setpoint allocation system solves at least one equation or algorithm to obtain the first and second welding machine setpoint values based on the system setpoint value.

5. The multiple arc welding system as defined in claim 1, wherein the welding machines each comprise a wire feeder, and wherein the setpoint allocation system provides first and second wire feed speed values to the first and second welding machines, respectively, based on the system setpoint value.

6. The multiple arc welding system as defined in claim 5, wherein the first and second welding machines derive power source waveform parameters from the first and second wire feed speed values, respectively.

7. The multiple arc welding system as defined in claim 1, wherein the setpoint allocation system derives first and second sets of power source waveform parameters based on the system setpoint value and provides the first and second sets of power source waveform parameters to the first and second welding machines, respectively.

8. The multiple arc welding system as defined in claim 1, further comprising a synchronizing controller adapted to synchronize the first and second welding machines, wherein the setpoint allocation system derives at least one synchronizing value based on the system setpoint value and provides the synchronizing value to the synchronizing controller.

9. The multiple arc welding system as defined in claim 8, wherein the synchronizing controller is integrated in the welding system controller.

10. The multiple arc welding system as defined in claim 1, further comprising a travel mechanism adapted to control a spatial relationship between a workpiece being welded and at least one of the first and second welding machines, and a travel mechanism controller fat controls operation of the travel mechanism, wherein the setpoint allocation system derives at least one travel control value based on the system setpoint value and provides the travel control value to the travel mechanism controller.

11. The multiple arc welding system as defined in claim 10, wherein the travel mechanism controller is integrated in the welding system controller.

12. A welding system controller for controlling a multiple arc welding system, the welding system controller comprising:
   a setpoint allocation system operatively coupled with first and second welding machines of the multiple arc welding system,
   the setpoint allocation system receiving a user selected system setpoint value for selecting setting a total output of the multiple arc welding system, and the setpoint allocation system providing first and second welding machine setpoint values based on the system setpoint value to the first and second welding machines in order to set the total output of the multiple arc welding system according to the system setpoint value,
   wherein the system setpoint value is one of a deposition rate, a weld size, and a travel speed and the total output is one of a total deposition rate, a total weld size, and a total travel speed of the multiple arc welding system.

13. The welding system controller as defined in claim 12, wherein the setpoint allocation system comprises a lookup table mapping the system setpoint value to the first and second welding machine setpoint values.

14. The welding system controller as defined in claim 12, wherein the setpoint allocation system solves at least one equation or algorithm to obtain the first and second welding machine setpoint values based on the system setpoint value.

15. The welding system controller as defined in claim 12, further comprising a synchronizing controller integrated in the welding system controller, the synchronizing controller being adapted to synchronize the first and second welding machines, wherein the setpoint allocation system derives at least one synchronizing value based on the system setpoint value and provides the synchronizing value to the synchronizing controller.

16. The welding system controller as defined in claim 15, further comprising a travel mechanism controller integrated in tie welding system controller, the travel mechanism controller being adapted to control operation of a travel mechanism in the multiple arc welding system to control a spatial relationship between a workpiece being welded and at least one of the first and second welding machines, wherein the setpoint allocation system derives at least one travel control value based on the system setpoint value and provides the travel control value to the travel mechanism controller.

17. The welding system controller as defined in claim 12, further comprising a travel mechanism controller Integrated in the welding system controller, the travel mechanism controller being adapted to control operation of a travel mechanism in the multiple arc welding system to control a spatial relationship between a workpiece being welded and at least one of the first and second welding machines, wherein the setpoint allocation system derives at least one travel control value based on the system setpoint value and provides the travel control value to the travel mechanism controller.

18. The welding system controller as defined in claim 12, wherein the setpoint allocation system derives first and second sets of power source waveform parameters based on the system setpoint value and provides the first and second sets of power source waveform parameters to the first and second welding machines, respectively.

19. In a multiple arc welding system, a method for controlling first and second welding machines according to a single user selected system setpoint value, the method comprising:
    obtaining a user selected system setpoint value for selecting setting a total output of the multiple arc welding system;
    determining first and second welding machine setpoint values based on the system setpoint value; and
    providing local setpoint signals to the first and second welding machines according to the first and second welding machine setpoint values in order to set the total output of the multiple arc welding system according to the system setpoint value,
    wherein the system setpoint value is one of a deposition rate, a weld size, and a travel speed, and the total output is one of a total deposition rate, a total weld size, and a total travel speed of the multiple arc welding system.

20. The method as defined in claim 19, wherein the first and second welding machine setpoint values are determined using a lookup table mapping the system setpoint value to the first and second welding machine set point values.

21. The method as defined in claim 19, wherein the first and second welding machine setpoint values are determined by solving at least one equation or algorithm to obtain the first and second welding machine setpoint values based on the system setpoint value.

22. A welding machine for creating a welding arc in a multiple arc welding system, the welding machine comprising:
    a power source for providing a welding signal to create a welding arc; and
    a welding system controller with a setpoint allocation system operative to provide first and second welding machine setpoint values based on a user selected system setpoint value for selecting setting a total output of the multiple arc welding system,
    wherein the power source is operative to provide a welding signal waveform to create a welding arc according to the first welding machine setpoint value, and
    wherein the system setpoint value is one of a deposition rate, a weld size, and a travel speed, and the total output is one of a total deposition rate, a total weld size, and a total travel speed of the multiple arc welding system.

23. The welding machine as defined in claim 22, wherein the setpoint allocation system provides the second setpoint value to another welding machine in the multiple arc welding system to set the total output of the multiple arc welding system according to the system setpoint value.

* * * * *